(12) United States Patent
Qiao

(10) Patent No.: US 11,777,180 B2
(45) Date of Patent: Oct. 3, 2023

(54) BATTERY PACK AND POWER TOOL ASSEMBLY

(71) Applicant: Positec Power Tools (Suzhou) Co., Ltd, Jiangsu (CN)

(72) Inventor: Yong Qiao, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 376 days.

(21) Appl. No.: 17/090,640

(22) Filed: Nov. 5, 2020

(65) Prior Publication Data

US 2021/0057686 A1 Feb. 25, 2021

Related U.S. Application Data

(63) Continuation of application No. PCT/CN2019/084269, filed on Apr. 25, 2019.

(51) Int. Cl.
*H01M 50/543* (2021.01)
*H01M 50/24* (2021.01)
*B25F 5/02* (2006.01)
*H01M 50/213* (2021.01)
*H01M 50/244* (2021.01)
(Continued)

(52) U.S. Cl.
CPC ............. *H01M 50/543* (2021.01); *B25F 5/02* (2013.01); *H01M 50/213* (2021.01); *H01M 50/24* (2021.01); *H01M 50/244* (2021.01); *H01M 50/247* (2021.01); *H01M 50/262* (2021.01); *H01M 50/296* (2021.01); *H01M 2220/30* (2013.01)

(58) Field of Classification Search
None
See application file for complete search history.

(56) References Cited

U.S. PATENT DOCUMENTS 5,607,792 A * 3/1997 Garcia ................ H04B 1/3883
429/97
8,640,979 B2 2/2014 Wu
(Continued)

FOREIGN PATENT DOCUMENTS

CN 1137648 C 2/2004
CN 101018633 A 8/2007
(Continued)

OTHER PUBLICATIONS

Machine translation of CN-206148487-U (Year: 2017).*

*Primary Examiner* — Gregg Cantelmo
(74) *Attorney, Agent, or Firm* — Dentons US LLP

(57) ABSTRACT

Embodiments of the present disclosure relate to a power tool assembly, including a tool body and a battery pack. The battery pack includes: an accommodated cell unit, a battery pack electrode base, a mounting cavity, and a locking apparatus. At least one of a power tool and the battery pack is configured with a plug socket seal member. The battery pack further includes an upper-lower housing body seal member disposed at a connection between an upper housing body and a lower housing body. When the upper housing body is coupled to the lower housing body, the upper-lower housing body seal member blocks communication between the outside and the mounting cavity. The locking apparatus is mounted on a battery pack housing, and the locking apparatus is isolated outside the mounting cavity.

18 Claims, 14 Drawing Sheets

(51) Int. Cl.
*H01M 50/262* (2021.01)
*H01M 50/247* (2021.01)
*H01M 50/296* (2021.01)

(56) References Cited

U.S. PATENT DOCUMENTS

| | | |
|---|---|---|
| 2008/0224657 A1 | 9/2008 | Hensel et al. |
| 2010/0092850 A1 | 4/2010 | Ueda et al. |
| 2010/0276946 A1* | 11/2010 | Whetten ............. H01M 50/262 |
| | | 292/102 |
| 2012/0018534 A1 | 1/2012 | Gilpatrick |
| 2012/0061117 A1 | 3/2012 | Nagasaka et al. |
| 2012/0251229 A1* | 10/2012 | Liang .................. H01M 50/213 |
| | | 403/321 |
| 2014/0248519 A1 | 9/2014 | Nishikawa et al. |
| 2014/0349143 A1* | 11/2014 | Ogura ................ H01M 50/267 |
| | | 429/7 |
| 2015/0214520 A1 | 7/2015 | Nishikawa et al. |
| 2016/0151799 A1 | 6/2016 | Reale |
| 2016/0226044 A1 | 8/2016 | Ikeda et al. |
| 2016/0236217 A1 | 8/2016 | Jenkins |
| 2017/0025650 A1 | 1/2017 | Altenburger et al. |
| 2017/0232482 A1 | 8/2017 | Fischer et al. |

FOREIGN PATENT DOCUMENTS

| | | |
|---|---|---|
| CN | 201918449 U | 8/2011 |
| CN | 102398252 A | 4/2012 |
| CN | 102637838 A | 8/2012 |
| CN | 102394528 B | 7/2013 |
| CN | 203304251 U | 11/2013 |
| CN | 103956441 A | 7/2014 |
| CN | 104114863 A | 10/2014 |
| CN | 104520074 A | 4/2015 |
| CN | 204992064 U | 1/2016 |
| CN | 205495890 U | 8/2016 |
| CN | 205570600 U | 9/2016 |
| CN | 203967212 U | 11/2016 |
| CN | 104797345 B | 12/2016 |
| CN | 206116475 U | 4/2017 |
| CN | 206148487 U * | 5/2017 |
| EP | 0420473 B2 | 1/1997 |
| EP | 0940864 A2 | 9/1999 |
| EP | 1309019 A2 | 5/2003 |
| EP | 2885113 A2 | 6/2015 |
| JP | 53104886 A | 1/1978 |
| JP | 2000061868 A | 2/2000 |
| JP | 2011161603 A | 8/2011 |
| JP | 2014037018 A | 2/2014 |
| JP | 2014107188 A | 6/2014 |
| JP | 2015044148 A | 3/2015 |
| JP | 2015509258 A | 3/2015 |
| JP | 2017024166 A | 2/2017 |
| WO | 2014/027439 A2 | 2/2014 |

* cited by examiner

BATTERY PACK AND POWER TOOL ASSEMBLY

This application is a Continuation of International Application No. PCT/CN2019/084269, filed Apr. 25, 2019, which claims the benefit of Chinese Patent Application No. 201810428287.6, filed May 7, 2018, all of which are hereby incorporated by reference as if fully set forth herein.

BACKGROUND

Technical Field

The present invention relates to a battery pack and a power tool to which the battery pack is applied, and in particular, to waterproofing and sealing of a battery pack coupled to a power tool.

Related Art

Cleaning requirements always exist widely in domestic life and outdoor activity. In domestic life centered on home yards, people often need to clean balconies, corridors, outdoor tables and chairs, grills, cars, bicycles, garages, pets, gardening tools, windows, swimming pools, outdoor steps, and the like. These objects are used outside a house and may inevitably gather mud, grease, leaves, and dust, which cannot be conveniently cleaned with dustcloth and need to be rinsed with high-pressure water streams. To satisfy such requirements, a commercially available solution is to provide domestic pressurized cleaning devices.

Further, for the portability in the use of users, at present, it becomes prevailing to use direct current battery packs to power pressurized cleaning devices. However, during the test or use of related products, water usually enters battery packs, and such battery packs are not adequately sealed. As a result, the products have safety hazards, and there are risks of short circuits, electrical leakage or even cell explosions of battery packs.

Therefore, to ensure the sealing performance of a machine, it is necessary to provide an improved solution to resolve the foregoing problems.

SUMMARY

To overcome the disadvantages in the prior art, the problem to be resolved by the present invention is to provide a power tool assembly that can prevent external water from entering a mounting cavity of a battery pack.

The technical solution used in the present invention to resolve the problem in the prior art is as follows: A power tool assembly, including a power tool and a battery pack electrically connected to the power tool, the power tool including:

a tool body; and a tool electrode base, disposed on the tool body, the tool electrode base including a plurality of tool terminals; and the battery pack being detachably coupled to the tool body, and the battery pack including: an upper housing body; a lower housing body, connected to the upper housing body to form a battery pack housing; a cell unit; a battery pack electrode base, including a plurality of battery pack terminals configured to connect to the plurality of tool terminals; a mounting cavity, the mounting cavity defined in the battery pack housing and accommodating the cell unit and the battery pack electrode base, the mounting cavity being provided with a plug socket for inserting the tool terminal to be electrically connected to the battery pack terminal; and a locking apparatus, capable of driving the battery pack and the power tool to be connected or detached, where when the battery pack is coupled to the power tool, a fitting gap exists between the power tool and the battery pack, and at least one of the power tool and the battery pack is configured with a plug socket seal member blocking a passage from the fitting gap to the plug socket;

when the upper housing body is coupled to the lower housing body, an assembly gap is provided between the upper housing body and the lower housing body, the battery pack further includes an upper-lower housing body seal member, and the upper-lower housing body seal member blocks a passage from the assembly gap to the mounting cavity;

the locking apparatus is mounted on the battery pack housing, and the locking apparatus is isolated outside the mounting cavity.

In one of the implementations, the tool electrode base is provided with a butting surface, the tool terminal at least partially protrudes outside the butting surface, the battery pack includes a fitting surface that can butt against and fit the butting surface, and the plug socket is formed on the fitting surface.

In one of the implementations, the plug socket seal member is disposed between the butting surface and the fitting surface.

In one of the implementations, the plug socket seal member is configured to be fixedly fit the butting surface, and when the battery pack is coupled to the power tool, the plug socket seal member is constructed into the fitting surface abutting the battery pack and isolates the plug socket from the outside.

In one of the implementations, the plug socket seal member is movably configured on the tool electrode base, a process of coupling the battery pack to the power tool can cause a change to a distance between the plug socket seal member and the butting surface of the tool electrode base, and at least one distance can prevent external water from entering the mounting cavity through the plug socket.

In one of the implementations, the plug socket seal member is a flexible seal washer, the flexible seal washer includes a plurality of through holes, and the through hole is used for the tool terminal to correspondingly pass through.

In one of the implementations, the fitting surface of the battery pack is formed by one or more surfaces of the upper housing body of the battery pack, and the plug socket seal member fits the one or more surfaces.

In one of the implementations, the battery pack is provided with a heat dissipation opening, the tool body is provided with a heat dissipation opening seal member, and the heat dissipation opening seal member is located above the heat dissipation opening to isolate the heat dissipation opening.

In one of the implementations, the battery pack housing is formed with a movement space for the locking apparatus to move, and the movement space is isolated outside the mounting cavity.

In one of the implementations, the upper-lower housing body seal member is disposed at a connection between the upper housing body and the lower housing body, and the upper-lower housing body seal member is constructed to be a seal ring disposed between the upper housing body and the lower housing body.

In one of the implementations, the power tool is a handheld pressurized cleaning device, the tool body includes an operation handle for holding, a body portion disposed at an angle from the operation handle, and a water outlet portion for spraying water, the handheld pressurized cleaning device further includes a functional member, and the functional member includes a motor disposed in the body portion and a pump for discharging water.

In one of the implementations, a working water pressure at which the handheld pressurized cleaning device discharges water is 0.2 Mpa to 10 Mpa, and a working water flowrate at which the handheld pressurized cleaning device discharges water is 1.5 L/Min to 8 L/Min.

In one of the implementations, one battery pack is configured, and a nominal output voltage of the battery pack is 18 V to 42 V.

In one of the implementations, two battery packs are configured, and a nominal output voltage of one battery pack is 18 V to 20 V.

To overcome the disadvantage in the prior art, the problem to be resolved by the present invention is to provide a power tool that can be detachably connected to a battery pack and prevent external water from entering a mounting cavity.

The technical solution used in the present invention to resolve the problem in the prior art is as follows: A power tool is configured to be detachably connected to a battery pack, and the power tool including: a tool body; and a tool electrode base, disposed on the tool body, the tool electrode base including a plurality of tool terminals, when the battery pack is coupled to the power tool, a fitting gap exists between the power tool and the battery pack, and at least one of the power tool and the battery pack is configured with a plug socket seal member blocking a passage from the fitting gap to a plug socket; and the battery pack further includes an upper-lower housing body seal member disposed at a connection between an upper housing body and a lower housing body, when the upper housing body is coupled to the lower housing body, and the upper-lower housing body seal member blocks communication between the outside and a mounting cavity; and the locking apparatus is mounted on a battery pack housing, and the locking apparatus is isolated outside the mounting cavity.

In one of the implementations, the tool electrode base is provided with a butting surface, the tool terminal at least partially protrudes outside the butting surface, the battery pack includes a fitting surface that can butt against and fit the butting surface, and the plug socket is formed on the fitting surface.

In one of the implementations, the plug socket seal member is disposed between the butting surface and the fitting surface.

In one of the implementations, the plug socket seal member is configured to be at least partially fixedly fit the butting surface, and when the battery pack is coupled to the power tool, the plug socket seal member is constructed into the fitting surface abutting the battery pack and isolates the plug socket from the outside.

In one of the implementations, the plug socket seal member is a flexible seal washer, the flexible seal washer includes a plurality of through holes, and the through hole is used for the tool terminal to correspondingly pass through.

In one of the implementations, the fitting surface of the battery pack is formed by one or more surfaces of the upper housing body of the battery pack, and the plug socket seal member fits the one or more surfaces.

In one of the implementations, the power tool is a handheld pressurized cleaning device, the tool body includes an operation handle for holding, a body portion disposed at an angle from the operation handle, and a water outlet portion for spraying water; and the handheld pressurized cleaning device includes a functional member, and the functional member includes a motor disposed in the body portion and a pump for discharging water.

In one of the implementations, a working water pressure at which the handheld pressurized cleaning device discharges water is 0.2 Mpa to 10 Mpa, and a working water flowrate at which the handheld pressurized cleaning device discharges water is 1.5 L/Min to 8 L/Min.

In one of the implementations, one battery pack is configured, and a nominal output voltage of the battery pack is 18 V to 60 V; or two battery packs are configured, and a nominal output voltage of one battery pack is 18 V to 42.4 V.

In one of the implementations, the structure in which the plug socket seal member blocks a passage from the fitting gap to the plug socket, the structure in which the upper-lower housing body seal member blocks a passage from an assembly gap to the mounting cavity, and the structure in which the locking apparatus is isolated outside the mounting cavity need to coexist in a same power tool assembly.

In one of the implementations, the plug socket seal member is a flexible seal washer, the flexible seal washer includes a plurality of through holes, and the through hole is configured to have a structure that does not prevent the plug socket seal member from closing the plug socket to be used for the tool terminal to correspondingly pass through.

In one of the implementations, the plug socket is approximately rectangular, the flexible seal washer has a plate form, the battery pack is coupled to the power tool, and the flexible seal washer can isolate the rectangular plug socket from the outside.

In one of the implementations, the plug socket is approximately L-shaped, the flexible seal washer is L-shaped, the battery pack is coupled to the power tool, and the flexible seal washer can isolate the L-shaped plug socket from the outside.

In one of the implementations, the tool electrode base has an L-shaped butting surface, and an L-shaped flexible seal washer can be connected to the L-shaped butting surface to isolate the L-shaped plug socket from the outside.

In one of the implementations, the L-shaped flexible seal washer includes a first part connected to the butting surface and a second part connected to the tool body, and the first part and the second part fit together to isolate the L-shaped plug socket from the outside.

In one of the implementations, the locking apparatus is detachably mounted on an outer surface of the upper housing body outside the mounting cavity.

In one of the implementations, the battery pack housing is formed with a movement space for the locking apparatus to move, and the movement space is isolated outside the mounting cavity, to prevent external water that enters the movement space from further flowing into the mounting cavity.

In one of the implementations, the upper housing body is integrally formed and is provided with a retaining cavity that is concave in an outer surface of the upper housing body and at least partially surrounds the locking apparatus, and the retaining cavity forms a movement space for the locking apparatus to vertically move, and the retaining cavity and the mounting cavity are not in communication with each other.

In one of the implementations, the battery pack includes an isolation member, the isolation member is detachably mounted on the battery pack housing and formed with a retaining cavity accommodating the locking apparatus, and the isolation member isolates the retaining cavity from the mounting cavity.

In one of the implementations, the battery pack further includes a seal structure located between the isolation member and the battery pack housing, and the seal structure prevents communication between the retaining cavity and the mounting cavity.

In one of the implementations, the seal structure is configured as a seal ring sandwiched between the isolation member and the battery pack housing.

In one of the implementations, one battery pack is configured, and a nominal output voltage of the battery pack is 18 V to 42 V.

In one of the implementations, two battery packs are configured, and a nominal output voltage of one battery pack is 18 V to 20 V.

In one of the implementations, the plug socket seal member is a flexible seal washer and has a preset thickness, in a process in which the battery pack and the power tool displace relative to each other to form a power tool assembly, the preset thickness makes the flexible seal washer be pressed by the battery pack to reach a particular degree of deformation, and the particular degree of deformation is configured to be that when the power tool assembly is immersed in water by more than 1 meter, the water pressure is less than the pressure exerted on the flexible seal washer by the battery pack.

In view of this, one of the objectives of the present invention is to provide a waterproof battery pack.

To achieve the foregoing objective, the technical solution used in the present invention is as follows: a battery pack, detachably attached to a power tool, the battery pack including: an upper housing body; a lower housing body, connected to the upper housing body to form a battery pack housing; a cell unit; a battery pack electrode base, including a plurality of battery pack terminals configured to connect to a plurality of tool terminals; a mounting cavity, the mounting cavity being defined in the battery pack housing and accommodating the cell unit and the battery pack electrode base, and the mounting cavity being provided with a plug socket for inserting the tool terminal to be electrically connected to the battery pack terminal; and a locking apparatus, capable of driving the battery pack and the power tool to be connected or detached, when the upper housing body is coupled to the lower housing body, an assembly gap is provided between the upper housing body and the lower housing body, the battery pack further includes an upper-lower housing body seal member, and the upper-lower housing body seal member blocks a passage from the assembly gap to the mounting cavity; and the locking apparatus is mounted on the battery pack housing, and the locking apparatus is isolated outside the mounting cavity.

In one of the implementations, the locking apparatus is detachably mounted on an outer surface of the upper housing body outside the mounting cavity.

In one of the implementations, the battery pack housing is formed with a movement space for the locking apparatus to move, and the movement space is isolated outside the mounting cavity, to prevent external water that enters the movement space from further flowing into the mounting cavity.

In one of the implementations, the locking apparatus includes an operation portion and a fastener portion, and the operation portion is capable of driving the fastener portion to move within the movement space relative to the upper housing body, to enable the battery pack to operably exit the power tool.

In one of the implementations, an elastic apparatus is provided between a bottom surface of the locking apparatus and an outer surface of the upper housing body, and the elastic apparatus can be pressed by the locking apparatus, so that the operation portion drives the fastener portion to move relative to the upper housing body.

In one of the implementations, the upper-lower housing body seal member is disposed at a connection between the upper housing body and the lower housing body, and the upper-lower housing body seal member is constructed to be a seal ring disposed between the upper housing body and the lower housing body.

In an embodiment, the battery pack includes an isolation member, the isolation member is detachably mounted on the battery pack housing and formed with a retaining cavity accommodating the locking apparatus, and the isolation member isolates the retaining cavity from the mounting cavity.

In an embodiment, the battery pack further includes a seal structure located between the isolation member and the battery pack housing, and the seal structure prevents communication between the retaining cavity and the mounting cavity.

In an embodiment, the seal structure is configured as a seal ring sandwiched between the isolation member and the battery pack housing.

In an embodiment, the upper-lower housing body seal member is constructed to be a seal ring disposed between the upper housing body and the lower housing body.

In an embodiment, the battery pack further includes a display apparatus that indicates working characteristics of the battery pack and a display apparatus accommodating cavity accommodating the display apparatus, the display apparatus accommodating cavity is defined on a side of the mounting cavity, and the display apparatus accommodating cavity is defined by the seal ring as a closed space.

In an embodiment, the display apparatus includes a control board and a power display lamp and a power display button that are electrically connected to the control board, and the power display button is operably triggered to turn on the power display lamp.

In an embodiment, the battery pack is provided with a heat dissipation opening, the tool body is provided with a heat dissipation opening seal member, and the heat dissipation opening seal member is located above the heat dissipation opening to isolate the heat dissipation opening.

To overcome the disadvantages in the prior art, the problem to be resolved by the present invention is to provide a power tool that prevents external water from entering a mounting cavity.

The technical solution used in the present invention to resolve the problem in the prior art is as follows is as follows:

A power tool includes: a tool body; and a tool electrode base, disposed on the tool body, the tool electrode base including a plurality of tool terminals; and the battery pack being detachably coupled to the tool body, and the battery pack including: an upper housing body; a lower housing body, connected to the upper housing body to form a battery pack housing; a cell unit; a battery pack electrode base, including a plurality of battery pack terminals configured to connect to the plurality of tool terminals; a mounting cavity, the mounting cavity being defined in the battery pack housing and accommodating the cell unit and the battery pack electrode base, and the mounting cavity being provided with a plug socket for inserting the tool terminal to be electrically connected to the battery pack terminal; and a locking apparatus, capable of driving the battery pack and the power tool to be connected or detached, where when the battery pack is coupled to the power tool, a fitting gap exists between the power tool and the battery pack, and at least one of the power tool and the battery pack is configured with a plug socket seal member blocking a passage from the fitting gap to the plug socket; and when the upper housing body is coupled to the lower housing body, an assembly gap is provided between the upper housing body and the lower housing body, the battery pack further includes an upper-lower housing body seal member, and the upper-lower housing body seal member blocks a passage from the assembly gap to the mounting cavity; the locking apparatus is mounted on the battery pack housing, and the locking apparatus is isolated outside the mounting cavity.

In an embodiment, the tool electrode base is provided with a butting surface, the tool terminal at least partially protrudes outside the butting surface, the battery pack includes a fitting surface that can butt against and fit the butting surface, and the plug socket is formed on the fitting surface.

In an embodiment, the plug socket seal member is disposed between the butting surface and the fitting surface.

In an embodiment, the plug socket seal member is configured to be at least partially fixedly fit the butting surface, and when the battery pack is coupled to the power tool, the plug socket seal member is constructed into the fitting surface abutting the battery pack and isolates the plug socket from the outside.

In an embodiment, the plug socket seal member is movably configured on the tool electrode base, a process of coupling the battery pack to the power tool can cause a change to a distance between the plug socket seal member and the butting surface of the tool electrode base, and at least one distance can prevent external water from entering the mounting cavity through the plug socket.

In an embodiment, the plug socket seal member is a flexible seal washer, the flexible seal washer includes a plurality of through holes, and the hole is configured to have a structure that does not prevent the plug socket seal member from isolating the plug socket to be used for the tool terminal to correspondingly pass through.

In an embodiment, the plug socket is approximately rectangular, the flexible seal washer has a plate form, the battery pack is coupled to the power tool, and the flexible seal washer can isolate the rectangular plug socket from the outside.

In an embodiment, the plug socket is approximately L-shaped, the flexible seal washer is L-shaped, the battery pack is coupled to the power tool, and the flexible seal washer can isolate the L-shaped plug socket from the outside.

In an embodiment, the tool electrode base has an L-shaped butting surface, and an L-shaped flexible seal washer can be connected to the L-shaped butting surface to isolate the L-shaped plug socket from the outside.

In an embodiment, the L-shaped flexible seal washer includes a first part connected to the butting surface and a second part connected to the tool body, and the first part and the second part fit together to isolate the L-shaped plug socket from the outside.

In an embodiment, the fitting surface of the battery pack is formed by one or more surfaces of the upper housing body of the battery pack, and the plug socket seal member fits the one or more surfaces.

In an embodiment, the locking apparatus is detachably mounted on an outer surface of the upper housing body outside the mounting cavity.

In an embodiment, the battery pack housing is formed with a movement space for the locking apparatus to move, and the movement space is isolated outside the mounting cavity, to prevent external water that enters the movement space from further flowing into the mounting cavity.

In an embodiment, the upper housing body is integrally formed and is provided with a retaining cavity that is concave in an outer surface of the upper housing body and at least partially surrounds the locking apparatus, the retaining cavity forms a movement space for the locking apparatus to vertically move, and the retaining cavity and the mounting cavity are not in communication with each other.

In an embodiment, the upper-lower housing body seal member is constructed to be a seal ring disposed between the upper housing body and the lower housing body.

In an embodiment, the power tool is a pressurized cleaning device, and the tool body includes an operation handle for holding, a body portion disposed at an angle from the operation handle, and a water outlet portion for spraying water.

In an embodiment, the pressurized cleaning device includes a functional member, and the functional member includes a motor disposed in the body portion and a pump for discharging water.

In an embodiment, a working water pressure at which the pressurized cleaning device discharges water is 0.2 Mpa to 10 Mpa, and a working water flowrate at which the handheld pressurized cleaning device discharges water is 1.5 L/Min to 8 L/Min.

In an embodiment, one battery pack is configured, and a nominal output voltage of the battery pack is 18 V to 42 V.

In an embodiment, two battery packs are configured, and a nominal output voltage of the battery pack is 18 V to 20 V.

In an embodiment, the plug socket seal member is a flexible seal washer and has a preset thickness, in a process in which the battery pack and the power tool displace relative to each other to form a power tool assembly, the preset thickness makes the flexible seal washer be pressed by the battery pack to reach a particular degree of deformation, the particular degree of deformation is configured to be that when the power tool assembly is immersed in water by more than 1 meter, the water pressure is less than the pressure exerted on the flexible seal washer by the battery pack.

Compared with the prior art, the present invention at least has the following beneficial effects:

1. A waterproof seal design is adopted at a joint between a battery pack and a pressurized cleaning device, a waterproof seal design is adopted between an upper housing body and a lower housing body of the battery pack, and a waterproof seal design is used at an accommodating cavity of a locking apparatus without changing the structure of a mounting cavity of the battery pack, so that slots that inevitably exist in the battery pack are comprehensively sealed. In this way, the simplest structural design with the lowest costs s used to prevent external water from entering the mounting cavity.

2. The battery pack has high compatibility, and the battery pack can power a pressurized cleaning device as well as other power tools.

DETAILED DESCRIPTION

Figure 1:
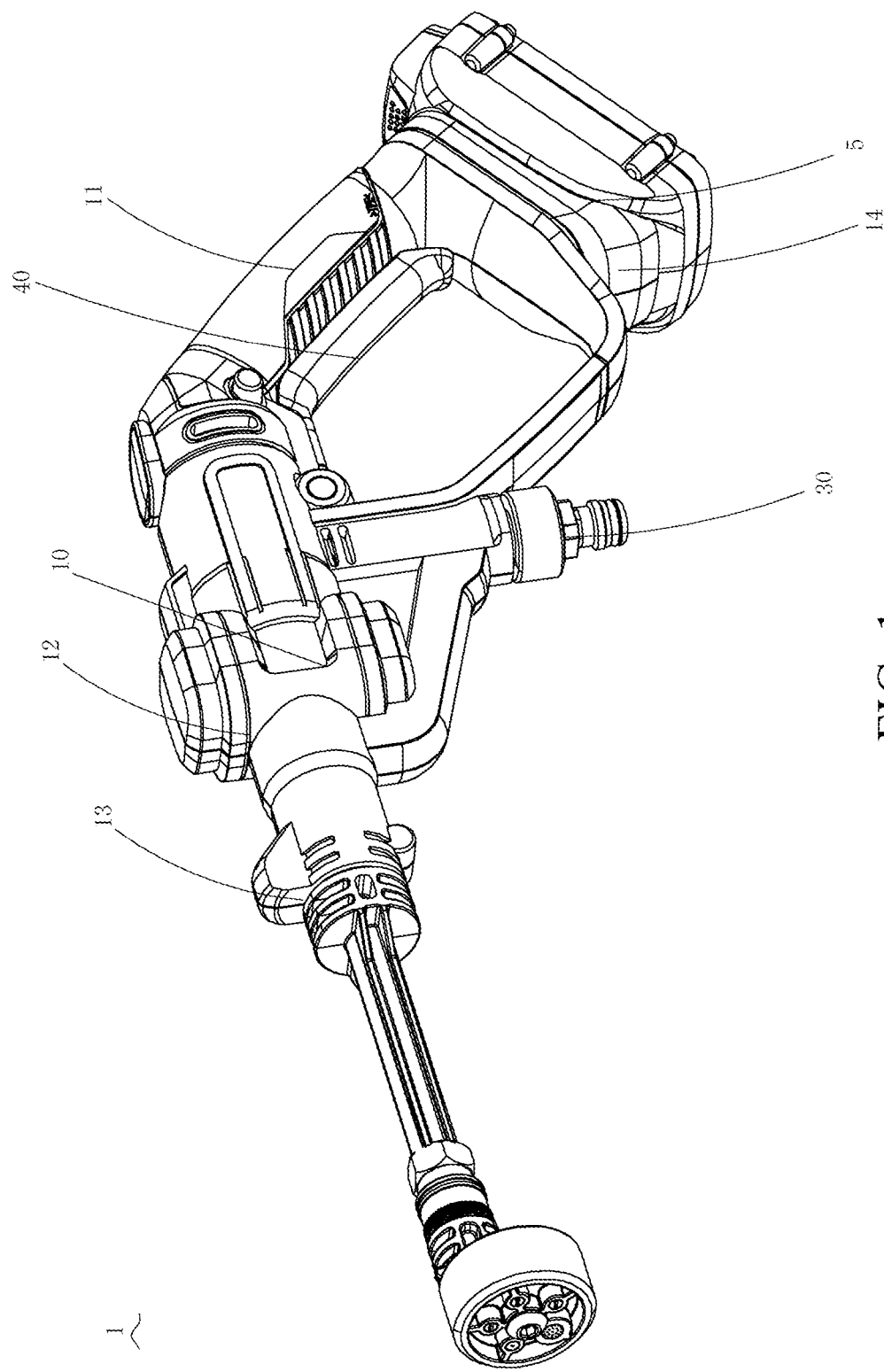
FIG. 1 is a schematic perspective view of a power tool assembly according to the present invention.

The preferred embodiments of the embodiments of the present disclosure are described below in detail with reference to the accompanying drawings to make the advantages and features of the present disclosure more comprehensible to a person skilled in the art, so as to define more clearly the scope of protection of the present disclosure. The same reference numerals and symbols are used to represent the same or equivalent components in different embodiments of the accompanying drawings and specification.

Figure 2:
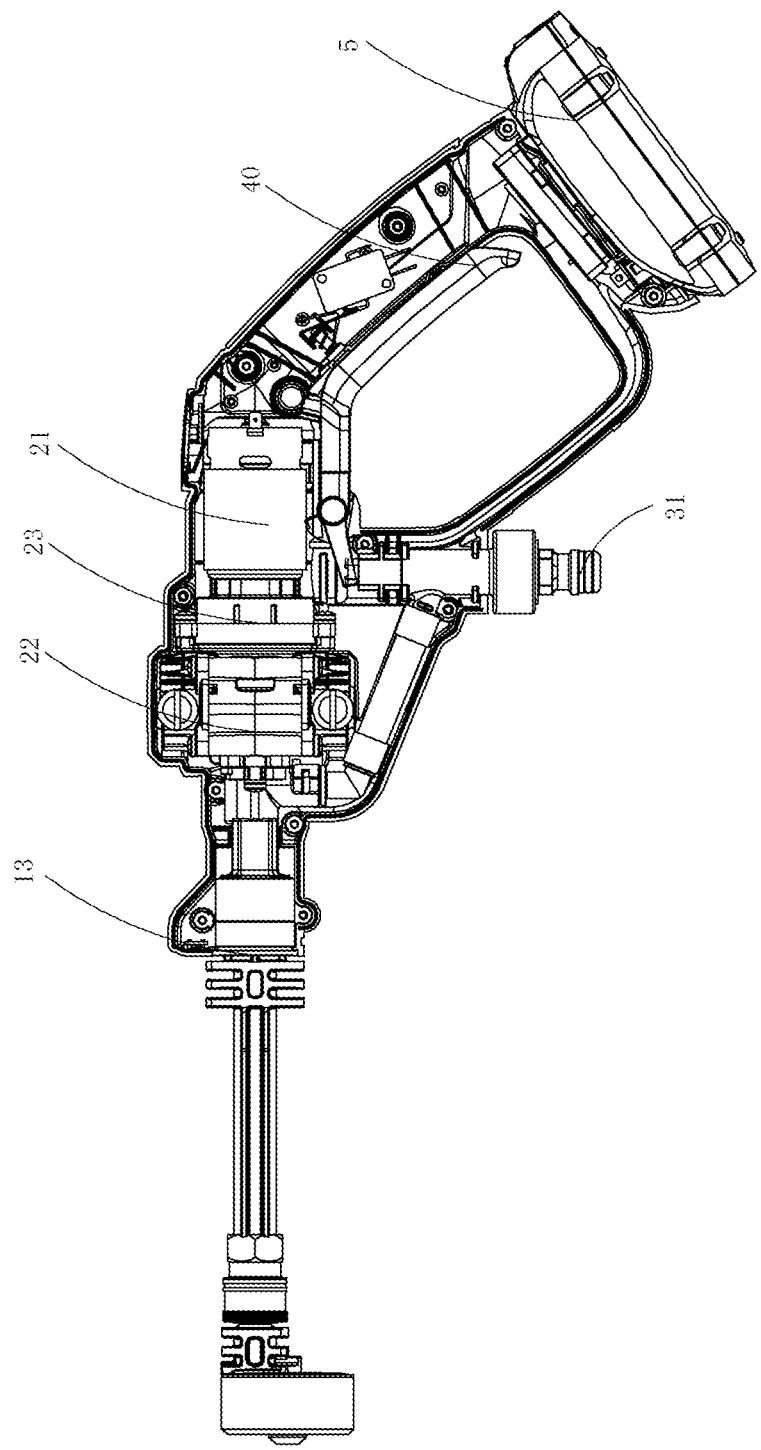
FIG. 2 is a schematic view showing the internal structure of the power tool assembly shown in FIG. 1 after a first half housing is opened.

A power tool shown in FIG. 1 and FIG. 2 is configured to be capable of being detachably connected to a battery pack 5. The battery pack 5 is coupled to the power tool to form a power tool assembly. In this implementation, the power tool is a pressurized cleaning device 1. The pressurized cleaning device 1 includes a tool body 10, a functional member 20, a liquid inlet joint 30, and a trigger mechanism 40.

The tool body 10 approximately has a handgun form. The tool body 10 uses a structure with a left half and a right half, and includes a first half housing and a second half housing that are connected. The tool body 10 includes an operation handle for holding 11, a body portion 12 disposed at an angle from the operation handle 11, and a water outlet portion 13 for spraying water. The functional member 20 is disposed in the body portion 12. The functional member 20 includes a motor 21, a pump 22 driven by the motor 21 to discharge water, and a transmission mechanism 23 connected between the motor 21 and the pump 22. Further, in the present invention, the motor 21 and the pump 22 are both disposed in the body portion 12. The pressurized cleaning device 1 is a handheld pressurized cleaning device 1.

The liquid inlet joint 30 is configured to connect to an external pipeline (water pipe) fed with a liquid to guide the liquid into the handheld pressurized cleaning device 1. One end of the liquid inlet joint 30 is connected to the tool body 10. The other end of the liquid inlet joint 30 is suspended and is provided with a liquid inlet opening 31. The liquid inlet joint 30 is in communication with the external pipeline (not shown) through the liquid inlet opening 31. When the liquid enters the liquid inlet joint 30 through the external pipeline to enter the tool body 10, under a high-pressure effect of the pressurized cleaning device 1, the water is sprayed outside through the water outlet portion 13 of the pressurized cleaning device 1 to clean the surface of an object.

The trigger mechanism 40 is disposed near the operation handle 11, and is specifically a trigger, configured to trigger communication between an external water source and the pump 22 and trigger the motor 21 to rotate.

Figure 3:
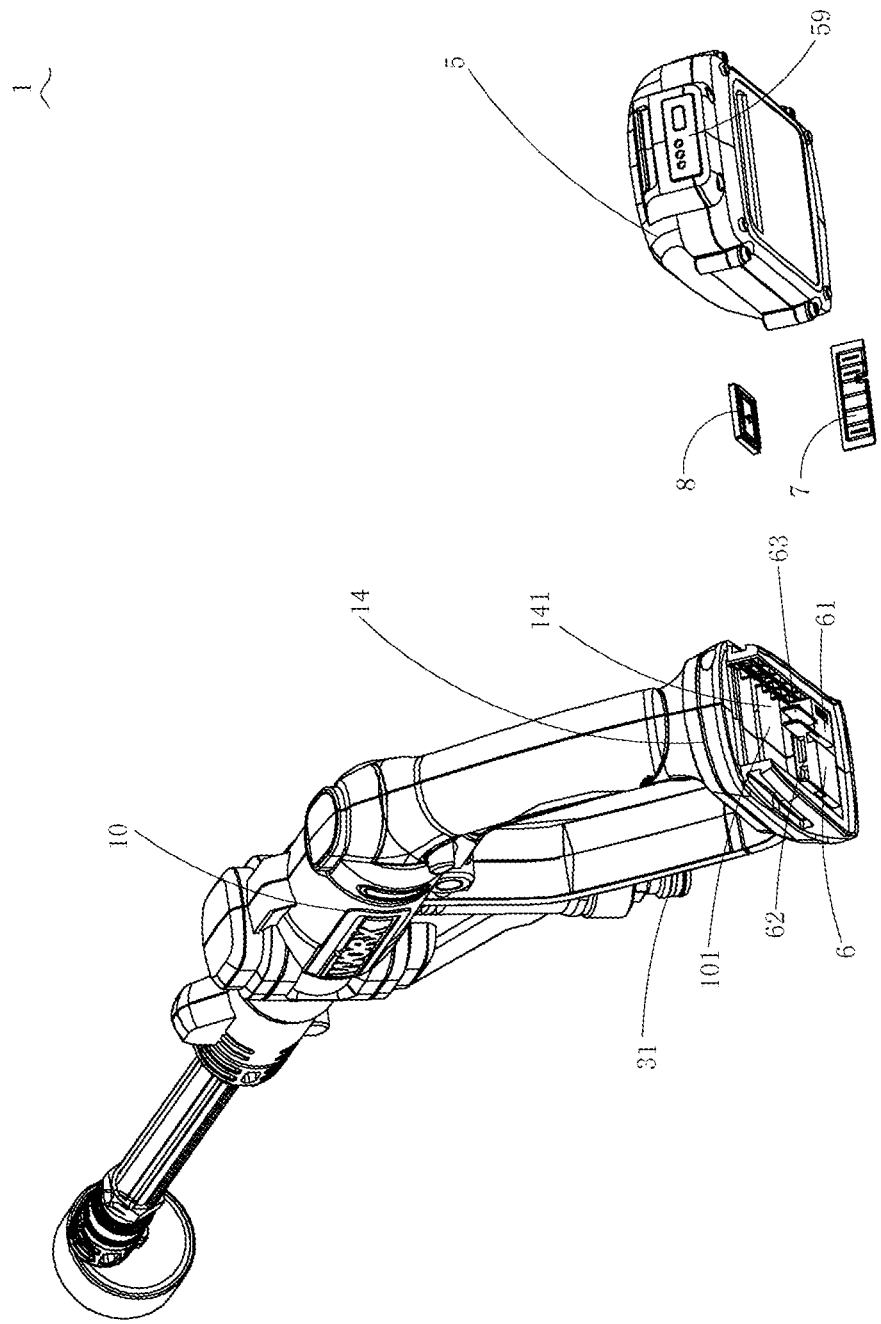
FIG. 3 is a partial exploded view of the power tool assembly shown in FIG. 1.

As shown in FIG. 1 and FIG. 3, the handheld pressurized cleaning device 1 further includes a sole portion 14 detachably coupled to the battery pack 5 and a tool electrode base 6 electrically connected to the battery pack 5. The tool electrode base 6 includes a base portion 61 provided with a butting surface 62 and a plurality of tool terminals 63 that are supported by the base portion 61. The sole portion 14 is disposed at an end, away from the body portion 12, of the operation handle 11. The body portion 12, the operation handle 11, and the sole portion 14 are configured to be an integral structure. In other words, the operation handle 11 and the sole portion 14 are formed by continuously extending from the body portion 12 in a preset direction. In this implementation, a concave groove 141 that is concave towards the body portion 12 is defined in the sole portion 14. The tool electrode base 6 is accommodated in the concave groove 141, and is constructed to be fixedly connected to the sole portion 14.

In one of the implementations, the fixed connection may be understood as that the tool electrode base 6 and the sole portion 14 are integrally formed through a bonding agent. Certainly, in other implementations, the tool electrode base 6 and the sole portion 14 may be alternatively fixedly connected through a mechanical structure. For example, the tool electrode base 6 is provided with a locking member (not shown), and the sole portion 14 is provided with a locking hole (not shown) for retaining and fitting the locking member. The tool electrode base 6 is inserted into the locking hole of the sole portion 14 by using the locking member, so that the tool electrode base 6 is reliably positioned.

The battery pack 5 that powers the handheld pressurized cleaning device 1 is disposed at an end, away from the body portion 12, of the operation handle 11. As shown in FIG. 5 to FIG. 13, the battery pack 5 includes an upper housing body 51, a lower housing body 53, a cell unit 54, and a battery pack electrode base 55. The upper housing body 51 and the lower housing body 53 respectively have an accommodating cavity. The upper housing body 51 and the lower housing body 53 are closed opposite each other to form a battery pack housing 50. The battery pack housing 50 is provided with a fitting surface 52 that can butt against and fit the butting surface 62, and defines a mounting cavity 540 that accommodates the cell unit 54 and the battery pack electrode base 55. The cell unit 54 includes several cells stacked in rows or rows and columns in the mounting cavity 540. Each cell 231 includes a first electrode terminal (not shown) and a second electrode terminal (not shown). The first electrode terminal and the second electrode terminal are disposed opposite each other and have opposite electrode polarity.

Figure 5:
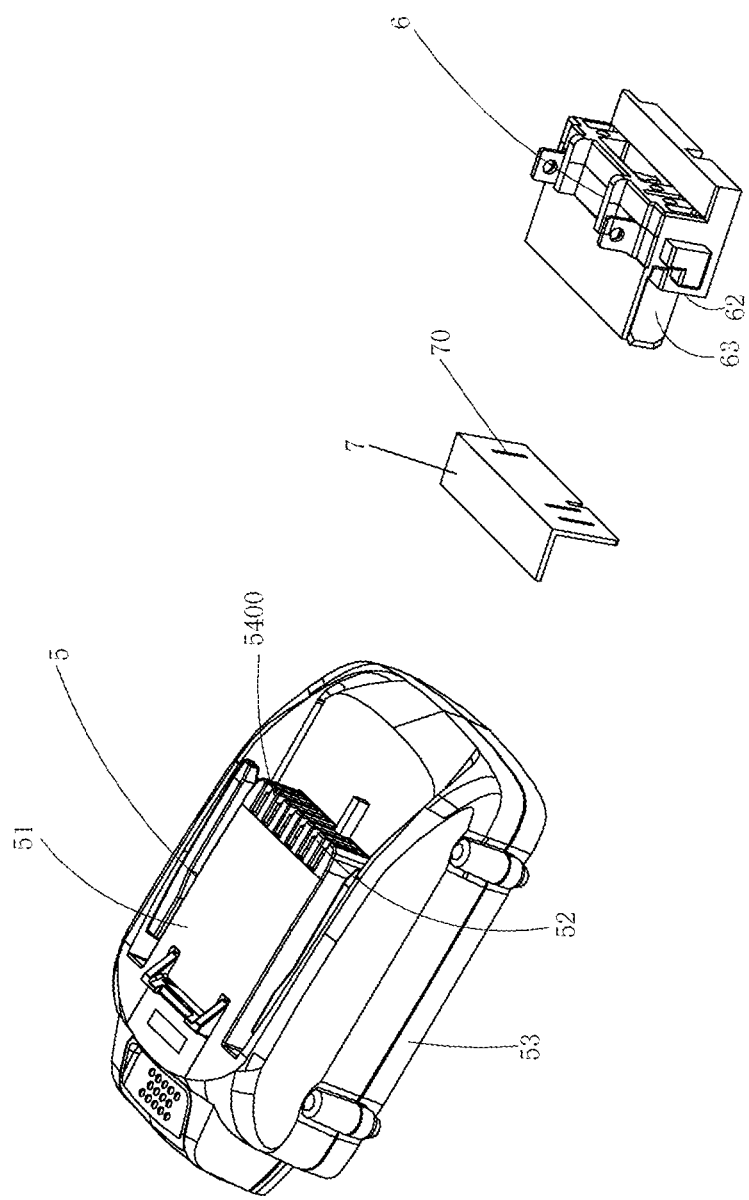
FIG. 5 is a partial exploded view from another angle in FIG. 4.
Figure 13:
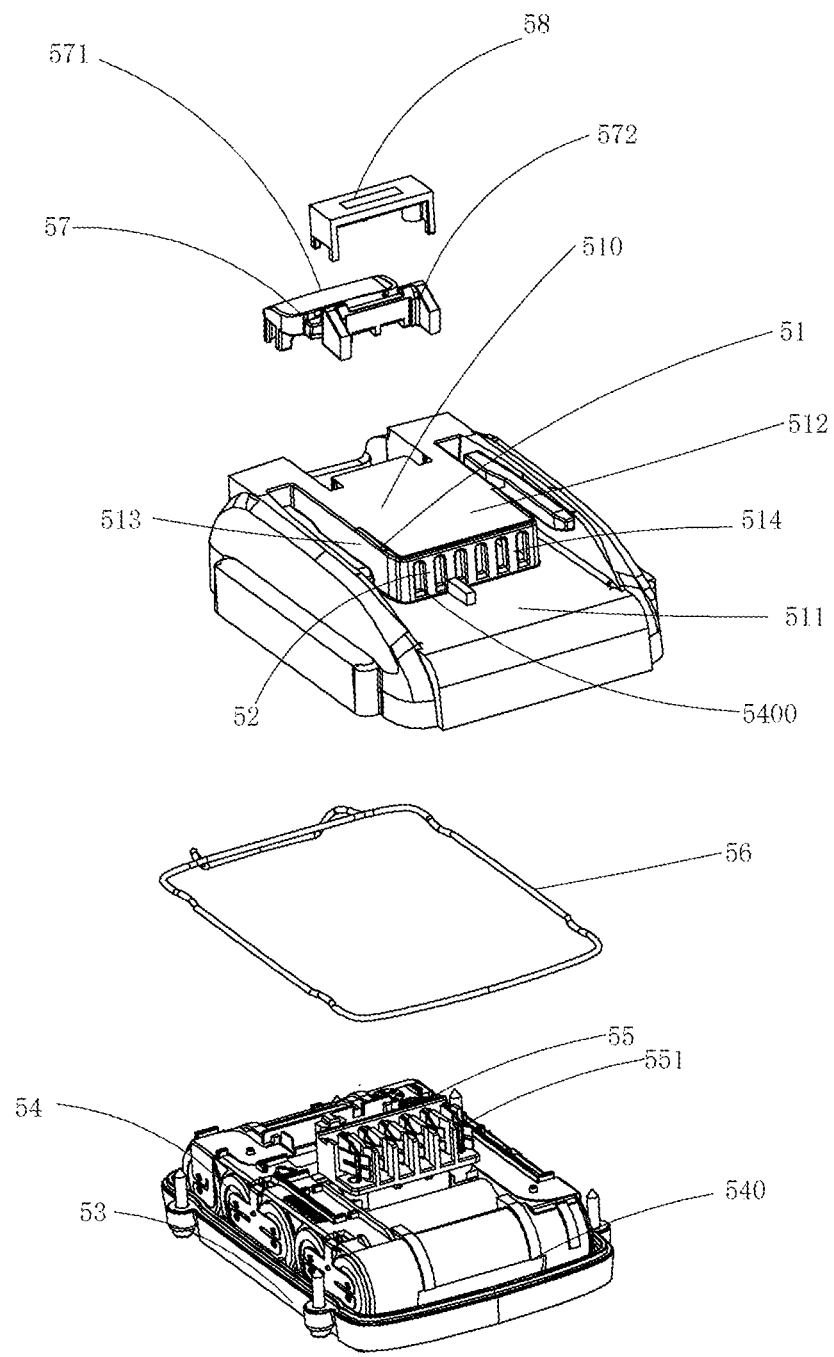
FIG. 13 is an exploded view of the battery pack shown in FIG. 12.
Figure 14:
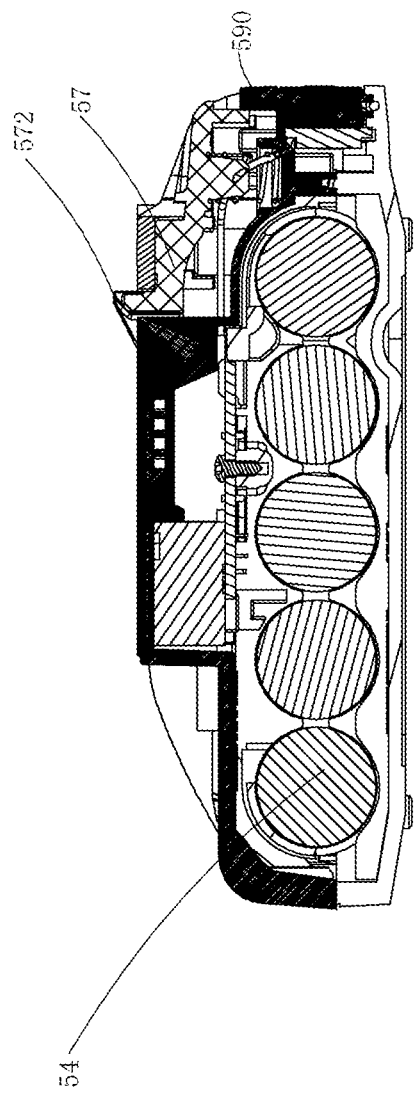
FIG. 14 is a sectional view of the battery pack shown in FIG. 11.

In this implementation, as shown in FIG. 5 and FIG. 13, the fitting surface 52 is formed on the upper housing body 51. Specifically, the upper housing body 51 includes an upper surface 511 and a boss 510 protruding upward from the upper surface 511. The boss 510 includes a top surface 512, a pair of side surfaces 513 connecting the upper surface 511 and the top surface 512, and a front end surface 514. The fitting surface 52 is formed by one or more surfaces of the upper housing body 51 of the battery pack 5. The battery pack electrode base 55 is accommodated in a chamber defined by the boss 510 and the cell unit 54. The battery pack electrode base 55 is provided with a plurality of battery pack terminals 551. The plurality of battery pack terminals 551 are connected to the plurality of tool terminals 63.

Figure 6:
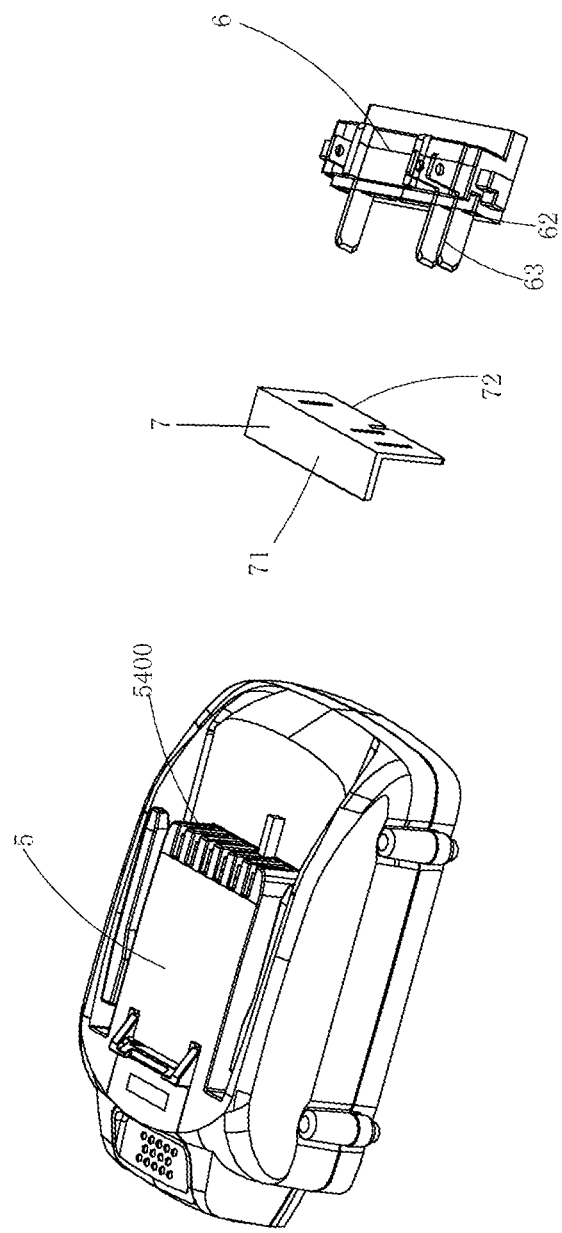
FIG. 6 is a schematic view of one of the implementations of a tool electrode base connected to an L-shaped plug socket seal member.

Further, in this implementation, the handheld pressurized cleaning device 1 and the battery pack 5 are inserted to fit to form a plug socket 5400 for electrically connecting the tool terminal 63 and the battery pack terminal 551. The plug socket 5400 may be optionally configured on the handheld pressurized cleaning device 1 or the battery pack 5. According to different positions at which the plug socket 5400 is provided, the present invention may provide two forms of structure of the battery pack 5. Specifically, as shown in FIG. 5 and FIG. 6, the plug socket 5400 is configured on the battery pack 5. The battery pack 5 has the first form of structure. That is, the tool terminal 63 at least partially protrudes outside the butting surface 62. It may be understood that the tool terminal 63 is configured to be a sheet-shaped terminal protruding outside. The fitting surface 52 of the battery pack 5 is formed with the plug socket 5400 for inserting the tool terminal 63 to be electrically connected to the battery pack terminal 551.

When the plug socket 5400 is configured on the handheld pressurized cleaning device 1, the battery pack 5 has a second form of structure (not shown). In this case, the battery pack terminal 551 is configured to be a sheet-shaped terminal protruding outside (not shown). The battery pack terminal 551 is inserted into the tool body 10 through the plug socket to be electrically connected to the tool terminal 63.

Figure 8:
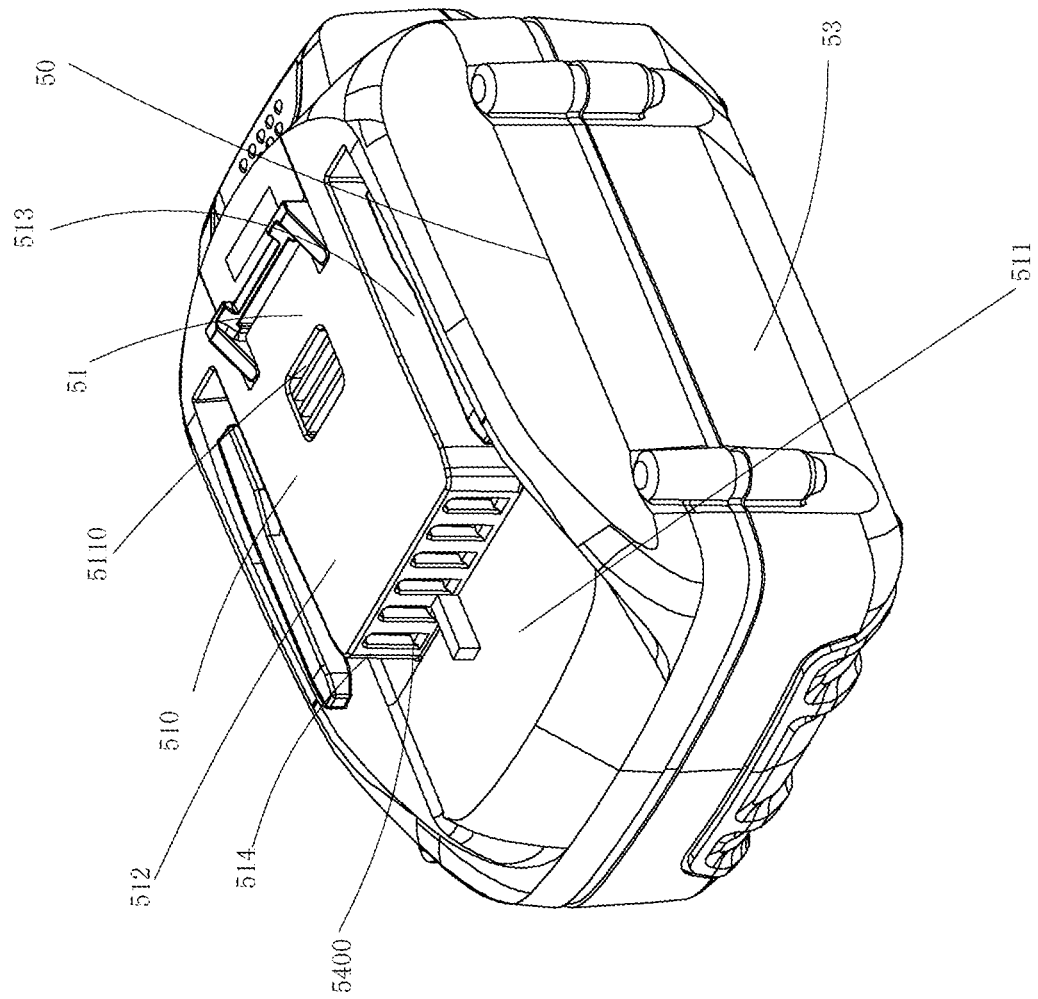
FIG. 8 is a schematic perspective view of a battery pack.
Figure 9:
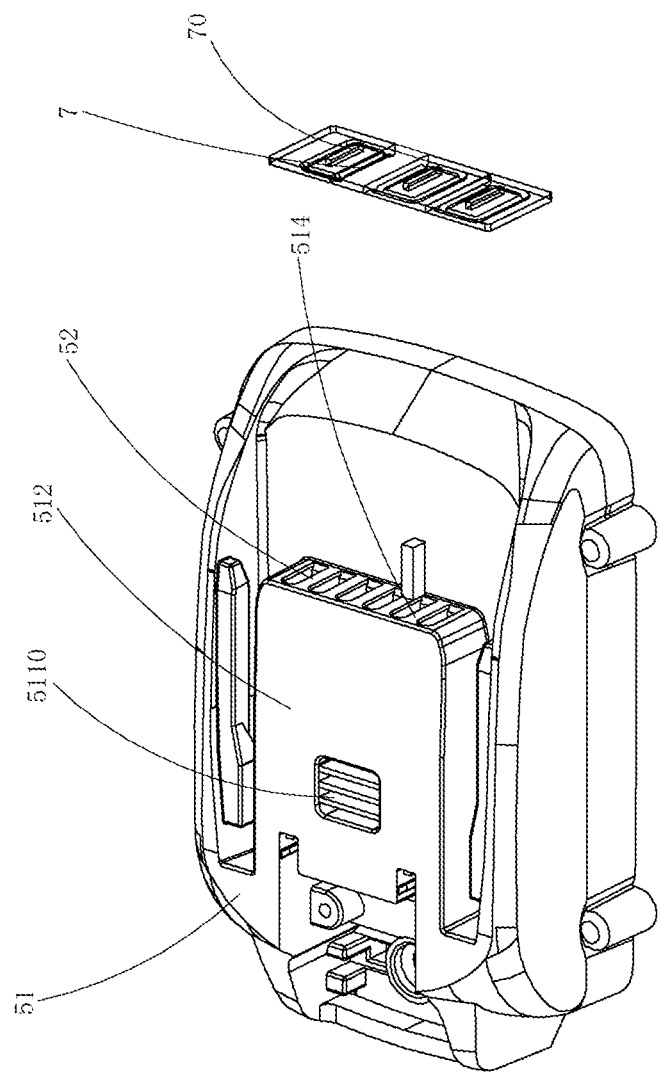
FIG. 9 is a perspective view of one of the implementations of an outer surface of a battery pack is connected to a plug socket seal member.
Figure 10:
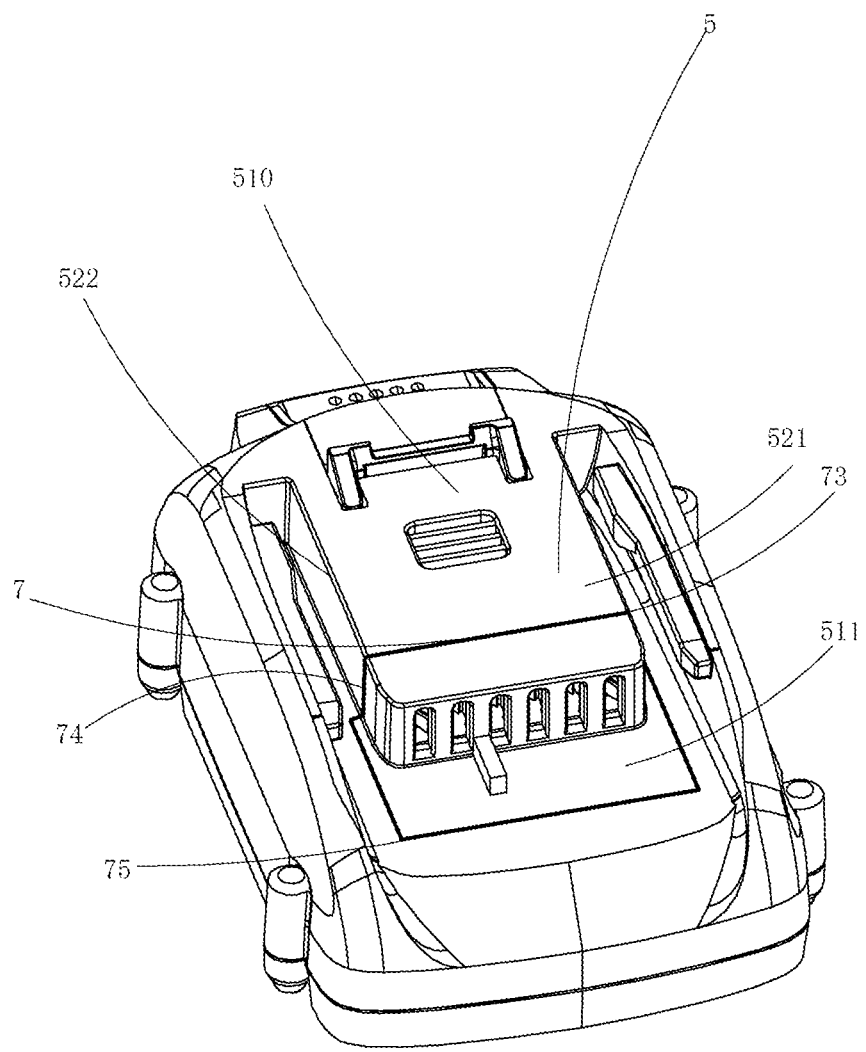
FIG. 10 is a perspective view of another implementation of an outer surface of a battery pack is connected to a plug socket seal member.
Figure 11:
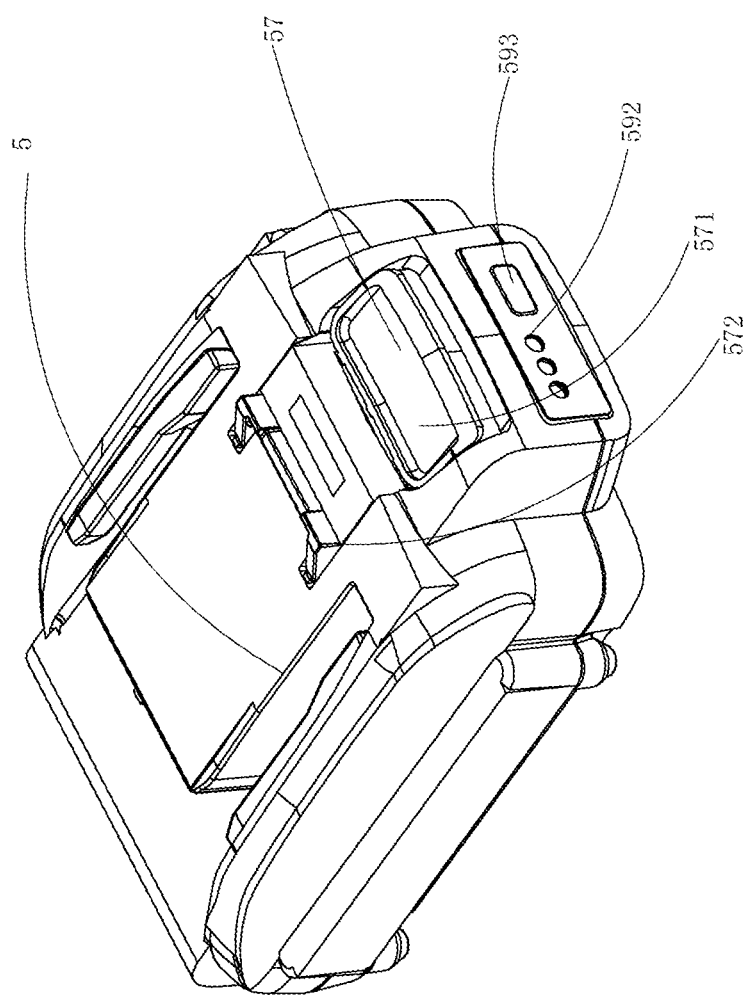
FIG. 11 is a schematic perspective view of the battery pack in another direction.

In this embodiment of the present disclosure, the battery pack 5 is shown in the first form of structure. Therefore, only the first structure is described. Regarding the form design of the plug socket 5400, in an implementation, as shown in FIG. 8 to FIG. 10, the plug socket 5400 is approximately rectangular. In another implementation, as shown in FIG. 5 and FIG. 6, the plug socket 5400 is approximately L-shaped.

As shown in FIG. 11 to FIG. 14, the battery pack 5 further includes a locking apparatus 57 mounted on the battery pack housing 50. The locking apparatus 57 is movable relative to the battery pack housing 50 to enable the battery pack 5 and the pressurized cleaning device 1 to be connected to or detached. Specifically, the locking apparatus 57 includes an operation portion 571 and a fastener portion 572. The operation portion 571 is specifically a button. The button is capable of driving the fastener portion 572 to vertically move relative to the battery pack housing 50, to enable the battery pack 5 to exit operably from the tool body 10.

Further, an elastic apparatus 573 is provided between a bottom surface of the locking apparatus 57 and an outer surface 511 of the upper housing body 51. Preferably, the elastic apparatus 573 is a spring. The outer surface 511 of the upper housing body 51 is provided with a mounting groove 515. The spring is at least partially limited in the mounting groove 515. When the battery pack 5 needs to be detached from the handheld pressurized cleaning device 1, the button is pressed, and the button drives the fastener portion 572 to move downward to be detached from the pressurized cleaning device 1. In this case, the spring is subject to a pressure from the button to provide the button with an upward restoring force to enable the locking apparatus 57 to restore the original height after being pressed. A guiding column 574 is provided at the edge of the bottom surface of the button, and correspondingly two vertical columns 516 are provided on the outer surface 511 of the upper housing body 51. The two vertical columns 516 form a guiding groove 517 for the guiding column 574 to be inserted and vertically move.

Regarding the fixed connection between the locking apparatus 57 and the battery pack housing 50, in one of the implementations, the battery pack 5 further includes a limiting block 58 for limiting a limit position for the upward movement of the locking apparatus 57. The limiting block 58 is mounted on the outer surface 511 of the upper housing body 51 and is held downwardly against at least a part of the locking apparatus 57. Specifically, the limiting block 58 may be fixedly mounted on the outer surface 511 of the upper housing body 51 through a screw. When the button is pressed, the locking apparatus 57 can move downward along the guiding groove 517. When a hand releases the button, the locking apparatus 57 can move upward along the guiding groove 517 to the bottom surface of the limiting block 58.

Certainly, in other implementations, the locking apparatus 57 and the upper housing body 51 of the battery pack 5 may be alternatively connected by using a conventional fastening manner.

Commercially available existing floor pressurized cleaning devices have large volumes and heavy weights, and it is difficult to move the floor pressurized cleaning devices among working scenarios. For example, during home cleaning, if windows, driveways, steps, and cars need to be cleaned one by one, the entire machine needs to be moved among different places. In an embodiment of the present disclosure, the pressurized cleaning device is designed to be a portable handheld pressurized cleaning device 1. For the portability requirement, the handheld pressurized cleaning device 1 does not have a water tank for storing a water source. Instead, the liquid inlet opening 31 of the body portion 12 is connected to the external pipeline, and the external pipeline is then connected to an external water source. The external water source may be a pond, tap water or a container apparatus similar to a water tank or cylinder. A working scenario of the handheld pressurized cleaning device mainly includes home cleaning and outdoor activity.

Further, a working water pressure at which the handheld pressurized cleaning device provided in this implementation is 0.2 Mpa to 10 Mpa, and a working water flowrate at which the handheld pressurized cleaning device discharges water is 1.5 L/Min to 8 L/Min. Specifically, the working water pressure at which the pressurized cleaning device discharges water may be 0.3 Mpa, 0.4 Mpa, 0.5 Mpa, 0.8 Mpa, 1 Mpa, 1.2 Mpa, 1.4 Mpa, 1.5 Mpa, 1.8 Mpa, 2 Mpa, 2.2 Mpa, 2.4 Mpa, 2.49 Mpa, 2.5 Mpa, 2.6 Mpa, 2.8 Mpa, 3.0 Mpa, 3.3 Mpa, 3.5 Mpa, 3.6 Mpa, 3.8 Mpa, 4 Mpa, 4.5 Mpa, 5 Mpa, 5.5 Mpa, 6 Mpa, 7 Mpa, 8 Mpa, 9 Mpa or the like. A working water flowrate at which the pressurized cleaning device discharges water may be alternatively 1.5 L/Min, 1.6 L/Min, 1.7 L/Min, 1.8 L/Min, 1.9 L/Min, 2 L/Min, 2.2 L/Min, 2.4 L/Min, 2.5 L/Min, 2.6 L/Min, 2.8 L/Min, 3.0 L/Min, 3.2 L/Min, 3.3 L/Min, 3.4 L/Min, 3.5 L/Min, 3.8 L/Min, 4 L/Min, 4.5 L/Min, 5 L/Min, 5.5 L/Min, 6 L/Min, 6.5 L/Min, 7 L/Min, 7.5 L/Min or the like.

In addition, according to the working condition and the handheld portability requirement of using the handheld pressurized cleaning device 1, in this implementation, a rechargeable lithium battery pack is used to supply energy to the handheld pressurized cleaning device 1. One or more battery packs 5 are provided. In one of the implementations, one battery pack 5 is provided. A nominal output voltage of the battery pack 5 is 18 V to 60 V. To be specific, the nominal output voltage of the battery pack 5 may be 18 V, 20 V, 28 V, 36 V, 38 V, 40 V, 42 V, 56 V or 60 V. A rated capacity of the battery pack 5 may be 1.5 Ah, 2 Ah, 2.5 Ah, 3 Ah or 4 Ah. Certainly, in another possible implementation, two battery packs 5 may be alternatively provided. A nominal output voltage of each battery pack 5 may be 18 V to 42.4 V. A rated capacity of the battery pack 5 may be 1.5 Ah, 2 Ah, 2.5 Ah, 3 Ah or 4 Ah. Further, in an embodiment of the present disclosure, the lithium battery pack can be adaptively connected to at least two different types of direct-current tools (for example, a lawn mower, pruning shears, a grass trimmer, and a chainsaw), so that the different types of direct-current tools share the battery pack, thereby reducing use costs for users. It should be noted that, the battery pack 5 may be alternatively a nickel-hydrogen battery or nickel-cadmium battery or the like instead of a lithium battery.

It should be noted that, the handheld pressurized cleaning device 1 powered by the battery pack 5 is bound to satisfy users' requirements of use convenience. However, the handheld pressurized cleaning device 1 powered by the battery pack 5 needs to satisfy corresponding waterproofing requirements, and different test mechanisms have corresponding test standards. In one aspect, when corresponding waterproofing requirements are satisfied, the handheld pressurized cleaning device 1 powered by the battery pack 5 can further ensure the safety of using the machine by a user. In another aspect, a waterproofing solution that satisfies corresponding waterproofing requirements further needs to satisfy corresponding test standards. A more strict waterproofing solution is provided in this implementation to ensure the safety of the machine, and can satisfy test standards in regulations on waterproofing safety from testing authorities.

It should be noted that the waterproofing requirements herein should be understood as follows: When the handheld pressurized cleaning device 1 has a corresponding water pressure and the battery pack 5 has a corresponding voltage, the handheld pressurized cleaning device 1 coupled with the battery pack 5 is placed in a corresponding extreme environment, and can satisfy IPX5 waterproofing requirements. It should further be noted that, compared with other power tools, the handheld pressurized cleaning device 1 is restricted by different manners in which a user holds the machine (according to different use scenarios or cleaning working conditions, the user may rotate the body in a longitudinal direction to choose an appropriate angle to hold the machine) and therefore has more strict waterproofing requirements. Therefore, the extreme environment herein should be understood as that the handheld pressurized cleaning device 1 coupled with the battery pack 5 needs to be tested at a plurality of angles. That is, when the machine is held vertically, horizontally, upside down or in others manners, the IPX5 waterproofing requirements can be satisfied.

Currently, many individual battery pack waterproofing solutions are commercially available. However, by means of these solutions, only a partial area of a battery pack can prevent water from entering the mounting cavity 540 of the battery pack 5, or water is prevented from entering the mounting cavity 540 of the battery pack 5 in only a single test direction (the machine is vertically placed). Such solutions are inadequate for these the handheld pressurized cleaning device assemblies (the handheld pressurized cleaning device 1 and the battery pack 5 are coupled to form a handheld pressurized cleaning device assembly) with relatively high waterproofing requirements, and the waterproofing problem cannot be completely resolved.

Persons skilled in the art of the present invention have been making ongoing researches. In this implementation, first, the handheld pressurized cleaning device 1 and the battery pack 5 are inserted to fit. Generally, a fit clearance exists at a fit. That is, a surface where the battery pack 5 and the handheld pressurized cleaning device 1 contact each other cannot be a completely tight fit, and there cannot be interference fit between the sheet-shaped tool terminal 63 and the plug socket 5400. That is, a gap usually exists between the sheet-shaped tool terminal 63 and the plug socket 5400. Further, an assembly gap exists between the battery pack electrode base 55 and the mounting cavity 540 of the battery pack 5. Therefore, the plug socket 5400 is in communication with the interior of the mounting cavity 540 of the accommodated cell unit 54. External water can flow into the plug socket 5400 through a fitting gap between the handheld pressurized cleaning device 1 and the battery pack 5, and flow into the mounting cavity 540 through the assembly gap between the battery pack electrode base 55 and the mounting cavity 540 to contact the cell unit 54. In this case, the circuits in the battery pack 5 are prone to short circuits, leading to safety hazards such as electrical leakage, electric shocks or even cell explosions.

Therefore, a butting area between the handheld pressurized cleaning device 1 and the battery pack 5 needs to be sealed. In this implementation, the plug socket 5400 is isolated from the outside. Specifically, when the battery pack 5 is coupled to the handheld pressurized cleaning device 1, a fitting gap exists between the handheld pressurized cleaning device 1 and the battery pack 5. At least one of the handheld pressurized cleaning device 1 and the battery pack 5 is configured with a plug socket seal member 7 blocking a passage from the fitting gap to the plug socket 5400. The plug socket seal member 7 can isolate the plug socket 5400 from the outside to inhibit external water from flowing into the plug socket 5400 through the fitting gap, to prevent external water from flowing onto the cell unit 54 in the mounting cavity 540 through the plug socket 5400. Specifically, as shown in FIG. 3 to FIG. 7, FIG. 9, and FIG. 10, the plug socket seal member 7 is connected between the butting surface 62 of the tool electrode base 6 and the fitting surface 52 of the battery pack 5. It should be noted that herein that "between" includes that the plug socket seal member 7 is disposed on the butting surface 62 of the tool electrode base 6 and/or the plug socket seal member 7 is disposed on the fitting surface 52 of the battery pack 5.

An implementation in which the plug socket seal member 7 is connected to the butting surface 62 of the tool electrode base 6 is first discussed below.

In one of the implementations, as shown in FIG. 3 to FIG. 6, the plug socket seal member 7 fixedly fits at least a part of the butting surface 62 through a bonding agent. Certainly, the plug socket seal member 7 may be alternatively connected to the butting surface 62 by using a fastening member (not shown) or in any other feasible manner. When the battery pack 5 is mounted on the handheld pressurized cleaning device 1, the plug socket seal member 7 is constructed to abut the fitting surface 52 of the battery pack 5 and isolate the plug socket 5400 from the outside, to inhibit external water from entering the mounting cavity 540 of the battery pack 5 through the plug socket 5400. The plug socket seal member 7 may be one or a combination of an elastically deformable soft pad made of a waterproof insulation material and a single-sided tape. The plug socket seal member 7 may be block-shaped or strip-shaped. In this implementation, the plug socket seal member 7 connected to the butting surface 62 is a block-shaped flexible seal washer. Preferably, the block-shaped flexible seal washer has an integral form and includes a plurality of through holes 70. These holes 70 are configured to have a structure that does not prevent the flexible seal washer from isolating the plug socket 5400 for the tool terminal 63 to correspondingly pass through. Certainly, the plug socket seal member 7 may be optionally an integrally formed strip-shaped seal ring (not shown). The seal ring is annularly disposed on the butting surface 62. After the battery pack 5 is coupled to the handheld pressurized cleaning device 1, the plug socket 5400 is located in a sealed space defined by the strip-shaped seal ring.

Figure 7:
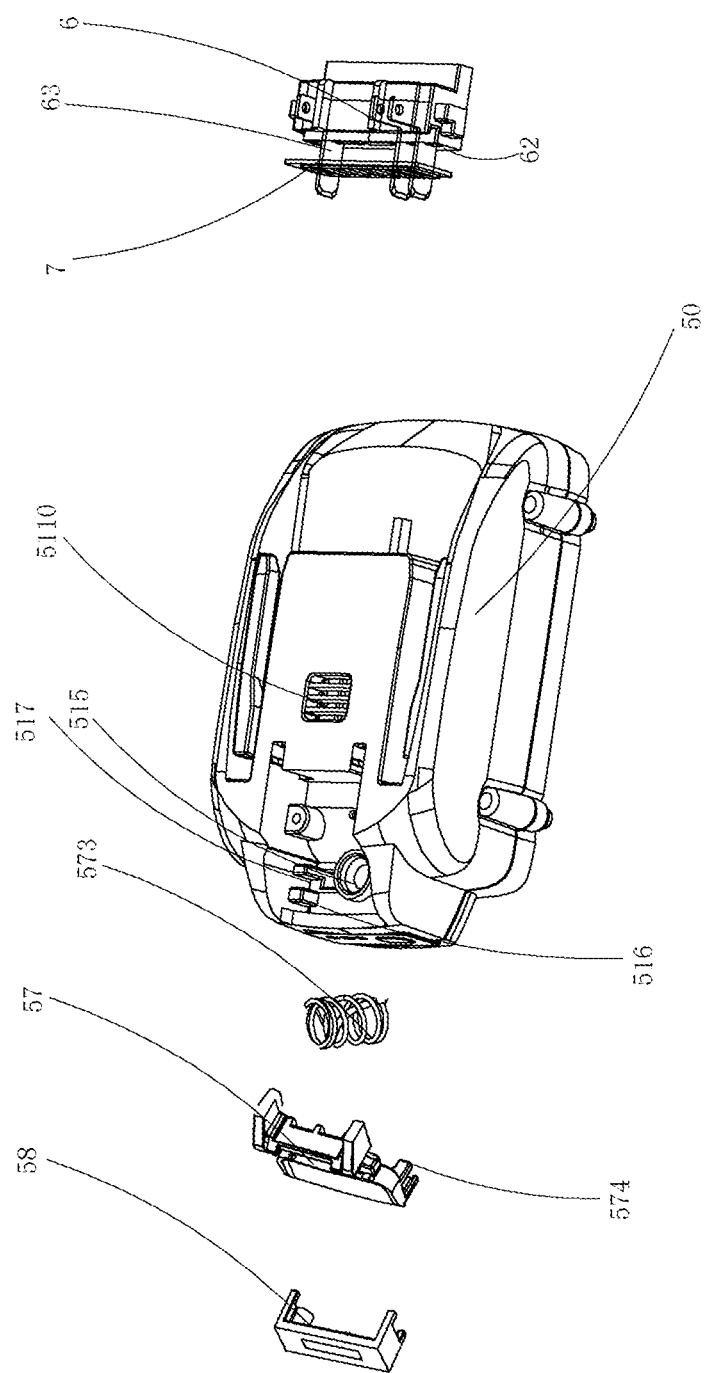
FIG. 7 is a schematic view of another implementation of a tool electrode base connected to a plug socket seal member.

In another implementation, as shown in FIG. 7, the plug socket seal member 7 can be movably disposed on the tool electrode base 6. A process of coupling the battery pack 5 to the handheld pressurized cleaning device 1 can cause a change to a distance between the plug socket seal member 7 and the butting surface 62 of the tool electrode base 6, and at least one distance can prevent external water from entering the mounting cavity 540 through the plug socket 5400. Herein, the movable arrangement may be understood as a non-fixed arrangement between the plug socket seal member 7 and the tool electrode base 6, and the plug socket seal member 7 is detachable.

Similarly, the plug socket seal member 7 in the implementation may be alternatively a block-shaped flexible seal washer. Preferably, the block-shaped seal washer has an integral form, and includes a plurality of through holes (not shown). It may be understood that, the flexible seal washer is sleeved over the corresponding tool terminal 63 through the holes. These holes (not shown) are configured to have a structure that does not prevent the flexible seal washer from isolating the plug socket 5400 for the tool terminal 63 to correspondingly pass through. Certainly, the block-shaped flexible seal washer may alternatively have a separate form.

Further, as discussed above, the plug socket 5400 may be rectangular or may be designed to be L-shaped. The "rectangular" herein may be understood as that the plug socket 5400 is only formed to be concave from the front end surface 514 into the mounting cavity 540 of the battery pack 5. In this case, the fitting surface 52 is the front end surface 514 of the upper housing body 51 of the battery pack 5. The "L-shaped" herein may be understood as that the plug socket 5400 is formed to be concave from the front end surface 514 and the top surface 512 into the mounting cavity 540 of the battery pack 5. In this case, the fitting surface 52 is formed by the front end surface 514 and the top surface 512 of the upper housing body 51 of the battery pack 5.

For an implementation in which the plug socket seal member 7 is connected to the butting surface 62 of the tool electrode base 6, an example in which the plug socket 5400 is rectangular is used for description below, in a design manner, as shown in FIG. 7, the plug socket seal member 7 connected to the butting surface 62 is a block-shaped flexible seal washer. Preferably, the block-shaped flexible seal washer has an integral form. The flexible seal washer and the butting surface 62 are glued together. The flexible seal washer connected to the butting surface 62 includes a plurality of through holes (not shown). These holes are configured to have a structure that does not prevent the flexible seal washer from closing a terminal butting cavity 50 for the tool terminal 63 to correspondingly pass through. Certainly, the plug socket seal member 7 may be optionally an integrally formed seal ring (not shown). The seal ring is annularly disposed on the butting surface 62. After the battery pack 5 is coupled to the handheld pressurized cleaning device 1, the opening of the plug socket 5400 is located in a sealed space defined by the seal ring.

Figure 4:
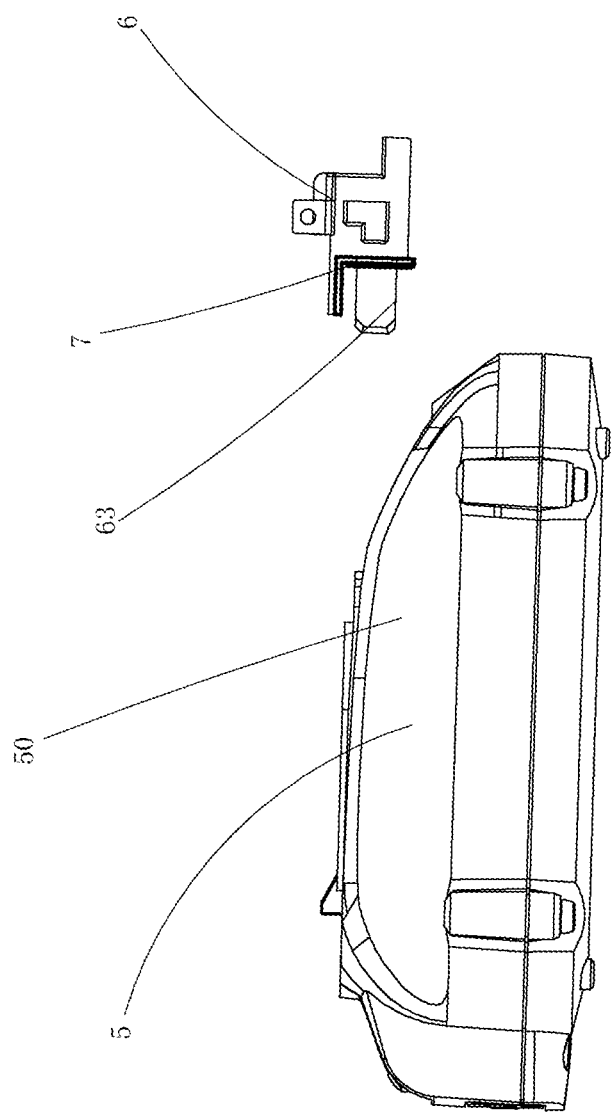
FIG. 4 is a schematic view of an L-shaped tool electrode base connected to an L-shaped plug socket seal member and a battery pack.

For an implementation in which the plug socket seal member 7 is connected to the butting surface 62 of the tool electrode base 6, an example in which the plug socket 5400 is L-shaped is used for description. Referring to FIG. 4 to FIG. 6, when the plug socket 5400 is L-shaped, the tool electrode base 6 may have two design manners. In a design manner, as shown in FIG. 4 and FIG. 5, the butting surface 62 of the tool electrode base 6 and the plug socket seal member 7 are both designed to be L-shaped. The L-shaped plug socket seal member 7 is connected to the L-shaped butting surface 62. When the battery pack 5 is mounted on the handheld pressurized cleaning device 1, the L-shaped plug socket seal member 7 is pressed between the L-shaped butting surface 62 and the fitting surface 52 of the battery pack 5 to isolate the L-shaped plug socket 5400 from the outside.

In another design manner, as shown in FIG. 6, the butting surface 62 of the tool electrode base 6 is still rectangular. Only the plug socket seal member 7 is L-shaped, and includes a first part 71 disposed as a suspending arm and a second part 72 connected to the tool body 10. In this implementation, the first part 71 and the second part 72 are disposed at approximately 90 degrees. The first part 71 and the second part 72 may be integrally disposed or may be alternatively separately disposed. When the battery pack 5 is mounted on the handheld pressurized cleaning device 1, the first part 71 of the L-shaped plug socket seal member 7 is pressed between the butting surface 62 and the fitting surface 52 of the battery pack 5, to seal an opening in the front end surface 514. The second part 72 of the L-shaped plug socket seal member 7 seals the opening in the top surface 512. The first part 71 and the second part 72 fit together to isolate the L-shaped plug socket 5400 from the outside.

An implementation in which the plug socket seal member 7 is connected to the fitting surface 52 of the battery pack 5 is discussed below.

In one of the implementations, as shown in FIG. 9 and FIG. 10, the plug socket seal member 7 may be connected to the fitting surface 52 of the battery pack 5. When the battery pack 5 is mounted on the handheld pressurized cleaning device 1, the plug socket seal member 7 is constructed to abut the butting surface 62 of the tool body 10 and isolate the plug socket 5400 from the outside, to inhibit external water from entering the mounting cavity 540 of the battery pack 5 through the plug socket 5400. The plug socket seal member 7 may be a block-shaped seal washer or a strip-shaped seal ring. Each of the seal washer and the seal ring is one or a combination of an elastically deformable soft pad made of a waterproof insulation material and a single-sided tape. The plug socket seal member 7 may be connected to the butting surface 62 through a bonding agent (glue) or may be alternatively connected to the butting surface 62 by using a fastening member or in any other feasible manner.

Similarly, as discussed above, the plug socket 5400 may be rectangular or may be designed to be L-shaped. The "rectangular" herein may be understood as that the plug socket 5400 is only formed to be concave from the front end surface 514 into the mounting cavity 540 of the battery pack 5. The "L-shaped" herein may be understood as that the plug socket 5400 is formed to be concave from the front end surface 514 and the top surface 512 into the mounting cavity 540 of the battery pack 5.

For an implementation in which the plug socket seal member 7 is connected to the battery pack 5, when the plug socket 5400 is rectangular, in a design manner, as shown in FIG. 9, the plug socket seal member 7 connected to the fitting surface 52 is a block-shaped flexible seal washer. Preferably, the block-shaped flexible seal washer has an integral form. The flexible seal washer and the front end surface 514 of the battery pack 5 are glued together. The flexible seal washer includes a plurality of through holes 70 connected to the front end surface 514 of the battery pack 5. These holes 70 are configured to have a structure that does not prevent the flexible seal washer from closing the terminal butting cavity 50 for the tool terminal 63 to correspondingly pass through. Certainly, the plug socket seal member 7 may be optionally an integrally formed seal ring. The seal ring is annularly disposed on the front end surface 514. When the battery pack 5 is coupled to the handheld pressurized cleaning device 1, an opening in the plug socket 5400 is located in a sealed space defined by the seal ring. In another design manner, as shown in FIG. 10, the plug socket seal member 7 connected to the fitting surface 52 is a strip-shaped seal ring. Specifically, the strip-shaped seal ring includes a first seal ring 73 connected to a top surface 521, a second seal ring 74 connected to a pair of side surfaces 522, and a third seal ring 75 in the upper surface 511. The first seal ring 73, the second seal ring 74, and the third seal ring 75 are connected head to tail, so that the opening of the terminal butting cavity 50 is annularly disposed in a sealed area defined by a flexible seal ring. Preferably, the strip-shaped seal ring has an integral form. It may be understood that, in the design solution, the first seal ring 73, the second seal ring 74, and the third seal ring 75 have integral strip-shaped structures.

When the plug socket 5400 is L-shaped, the design manner in FIG. 10 is also applicable, provided that it is ensured that the L-shaped plug socket 5400 is located in a range defined by the flexible seal ring.

Next, the upper housing body 51 and the lower housing body 53 of the battery pack 5 provided in the present invention have separate structures. After the upper housing body 51 and the lower housing body 53 are closed opposite each other, an assembly gap exists at a connection between the upper housing body 51 and the lower housing body 53. External water can flow into the mounting cavity 540 of the battery pack 5 through the assembly gap, and the cell unit 54 may contact water. In this case, the circuits in the battery pack 5 are prone to short circuits, leading to safety hazards such as electrical leakage, electric shocks or even cell explosions. Therefore, the upper housing body 51 of the battery pack 5 and the lower housing body 53 need to be sealed. Specifically, as shown in FIG. 13, the battery pack 5 further includes an upper-lower housing body seal member 56. When the upper housing body 51 is assembled to the lower housing body 53, the upper-lower housing body seal member 56 blocks external water from flowing into the mounting cavity 540 through the assembly gap between the upper housing body 51 and the lower housing body 53.

In one of the implementations, the upper-lower housing body seal member 56 is disposed at a connection between the upper housing body 51 and the lower housing body 53. When the upper housing body 51 and the lower housing body 53 are closed opposite each other, the upper-lower housing body seal member 56 blocks a passage from an assembly gap between the upper housing body 51 and the lower housing body 53 to the cell unit 54. It should be noted that the connection herein is an area where the entire circumferential edge of the upper housing body 51 and the entire circumferential edge of the lower housing body 53 are in contact. In an implementation, the upper-lower housing body seal member 56 is an O-shaped seal ring. The upper housing body 51 and the lower housing body 53 are fixedly connected to generate a pressure to the O-shaped seal ring, to enable the O-shaped seal ring to fill the joining gap at the connection between the upper housing body 51 and the lower housing body 53. Certainly, in other implementations, the upper-lower housing body seal member 56 may be alternatively a welding member. That is, the upper housing body 51 and the lower housing body 53 are sealed in a welding manner.

Preferably, the battery pack 5 further includes a display apparatus 59 that indicates working characteristics of the battery pack 5 and a display apparatus accommodating cavity 590 accommodating the display apparatus 59. The display apparatus accommodating cavity 590 is located on a side of the mounting cavity 540. The display apparatus 59 includes a control board (not shown) and a power display lamp 592 and a power display button 593 that are electrically connected to the control board. The power display button 593 is operably triggered to turn on the power display lamp 592. In this implementation, the display apparatus accommodating cavity 590 is defined by the upper-lower housing body seal member 56 as a closed space, to prevent external water from flowing into the battery pack 5 through the display apparatus accommodating cavity 590.

In addition, an existing locking apparatus is assembled on the battery pack housing 50, and the locking apparatus is at least partially located in the mounting cavity 540. The locking apparatus is movable relative to the battery pack housing 50, to enable the battery pack housing 50 to be connected or detached. In such a design, a movement gap for the locking apparatus to move is provided between the locking apparatus and the mounting cavity 540. Therefore, external water can easily enter the mounting cavity 540 of the battery pack through the movement gap, resulting in water on the cell unit. Specifically, there may be water on two electrode terminals of the cell unit and/or there is residual water between cells. Therefore, for a retaining battery pack, the locking apparatus of the retaining battery pack needs to be isolated from the mounting cavity 540 of the battery pack.

Figure 12:
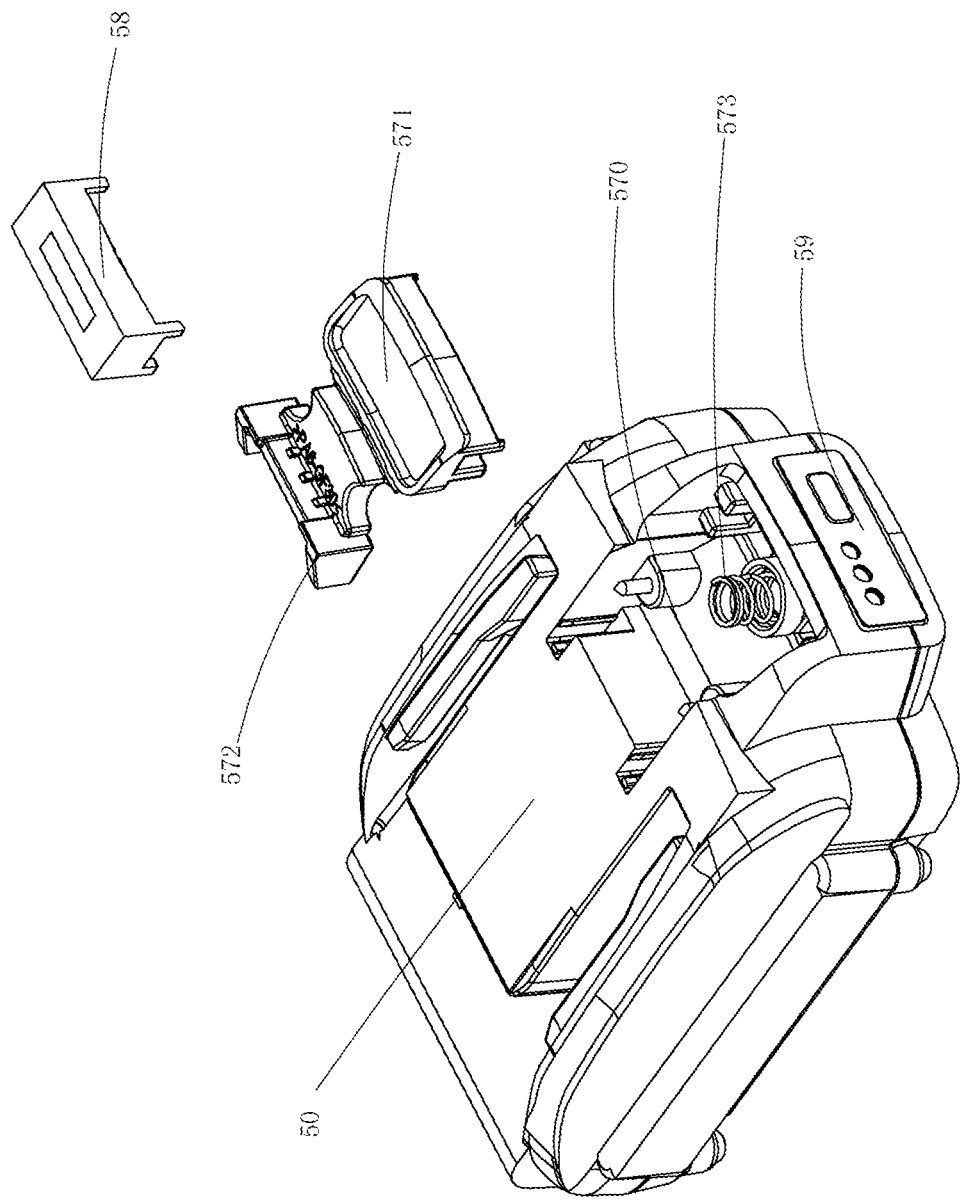
FIG. 12 is a partial exploded view of the battery pack shown in FIG. 11.

Specifically, with reference to FIG. 12 and FIG. 13, the locking apparatus 57 and the mounting cavity 540 are configured to be independent of each other and are not in communication. Further specifically, the locking apparatus 57 is mounted on the battery pack housing 50, and the locking apparatus 57 is isolated from the mounting cavity 540. The battery pack housing 50 is formed with a movement space for the locking apparatus 57 to move. The movement space is independently isolated from the mounting cavity 540, to prevent external water that enters the movement space from further flowing into the mounting cavity 540.

In one of the implementations, the locking apparatus 57 is detachably mounted on the outer surface 511 of the upper housing body 51 outside the mounting cavity 540. Specifically, as shown in FIG. 12, the upper housing body 51 of the battery pack 5 is integrally formed, and is provided with a retaining cavity 570 that is concave in the outer surface 511 of the upper housing body 51 and at least partially surrounds the locking apparatus 57. The retaining cavity 570 forms a movement space for the locking apparatus 57 to vertically move. The retaining cavity 570 and the mounting cavity 540 are not in communication with each other, to prevent external water that enters the retaining cavity 570 from further entering the mounting cavity 540.

In another implementation, the battery pack 5 includes an isolation member (not shown). The isolation member is detachably mounted on the battery pack housing 50 and formed with a retaining cavity accommodating the locking apparatus 57. That is, the isolation member isolates the retaining cavity from the mounting cavity 540. In this implementation, the battery pack 5 is further provided with a seal structure located between the isolation member and the battery pack housing 50, to block a passage from an assembly gap between the isolation member and the battery pack housing 50 to the mounting cavity 540. Specifically, the seal structure is configured as a seal ring pressed between the isolation member and the battery pack housing 50. Certainly, the isolation member and the battery pack housing 50 may be alternatively sealed in a welding manner.

In a waterproofing solution provided for a handheld pressurized cleaning device assembly in the present invention, in a same handheld pressurized cleaning device assembly, a structure in which the plug socket seal member 7 blocks a passage from the fitting gap between the battery pack 5 and the handheld pressurized cleaning device 1 to the plug socket 5400, a structure in which the upper-lower housing body seal member 56 blocks communication between the outside and the mounting cavity 540 through an assembly gap between the upper housing body 51 and the lower housing body 52, and a structure in which the locking apparatus 57 is isolated outside the mounting cavity 540 need to coexist in a same power tool assembly (for example, the handheld pressurized cleaning device assembly).

Further, the flexible seal washer connected between the butting surface 62 and the fitting surface 52 has a preset thickness. In a process in which the battery pack 5 and the handheld pressurized cleaning device 1 displace relative to each other to form the handheld pressurized cleaning device assembly, the preset thickness makes the flexible seal washer be pressed by the battery pack 5 to reach a particular degree of deformation, and the particular degree of deformation is configured to be that when the handheld pressurized cleaning device assembly is immersed in water by more than 1 meter, the water pressure is less than the pressure exerted on the flexible seal washer by the battery pack 5. Preferably, a range of the preset thickness is 1 mm to 10 mm. To be specific, the preset thickness may be 1 mm, 2 mm, 3 mm, 4 mm, 5 mm, 6 mm, 7 mm, 8 mm or 9 mm. In such a configuration, it may be ensured that during testing, the flexible seal washer stays pressed between the battery pack 5 and the handheld pressurized cleaning device 1.

In a waterproofing design provided for the handheld pressurized cleaning device assembly in the present invention, the waterproofing herein mainly means that the handheld pressurized cleaning device assembly can satisfy IPX7 waterproofing requirements when being placed in an extreme working condition. The extreme working condition herein may be understood as that the machine is rinsed with tap water for 10 minutes in a plurality of directions or the machine is immersed in water by 1 m for 30 minutes. At least three structures are combined to form a waterproof system that can completely inhibit external water from entering a mounting cavity. While the waterproof system provided in the present invention ensures waterproofing reliability, the structure is a simple structure, the costs are low, and no major change needs to be made to a battery pack platform, so that a battery pack powering the handheld pressurized cleaning device may also power other power tools.

Further, as shown in FIG. 9, the battery pack 5 in the implementation of the present invention is further provided with a heat dissipation opening 5110. The heat dissipation opening 5110 is formed on the top surface 512 of the upper housing body 51. As shown in FIG. 3, the handheld pressurized cleaning device 1 further includes a heat dissipation opening seal member 8 that is disposed on the tool body 10 and is configured to seal the heat dissipation opening 5110. The heat dissipation opening 5110 is optionally disposed in the battery pack 5. When the upper surface 511 of the battery pack 5 has the structure of the heat dissipation opening 5110, the added heat dissipation opening seal member 8 may block the heat dissipation opening 5110 to further achieve a sealing and waterproofing effect for the battery pack 5. For a handheld pressurized cleaning device that works at a small current, even if the heat dissipation opening 5110 of the battery pack 5 is closed or no heat dissipation opening 5110 is disposed, the normal use of the handheld pressurized cleaning device is not affected. In this case, the solution provided in this embodiment may implement that a battery pack 5 that is provided with the structure of the heat dissipation opening 5110 and has a large current can also be connected to the tool body 10, and further, the compatibility of the battery pack 5 is achieved.

As shown in FIG. 3, the sole portion 14 of the tool body 10 is concavely provided with an accommodating groove 101 for accommodating the heat dissipation opening seal member 8. The heat dissipation opening seal member 8 and the accommodating groove 101 may be integrally formed through a bonding agent. Certainly, in another implementation, the heat dissipation opening seal member 8 may be alternatively directly disposed on the battery pack 5.

The heat dissipation opening seal member 8 may be alternatively a single-sided tape or a soft pad made of a flexible plastic waterproof material. The heat dissipation opening seal member 8 has an integral block-shaped structure, and may be connected in the accommodating groove 101 through bonding with a glue or by using a fastening member or in any other appropriate manner.

The foregoing embodiments only describe several implementation manners of the present invention, and their description is specific and detailed, but cannot therefore be understood as a limitation to the patent scope of the present invention. It should be noted that a person of ordinary skill in the art may further make several variations and improvements without departing from the conception of the present invention, and these all fall within the protection scope of the present invention.

What is claimed is:
1. A power tool assembly comprising:
    a power tool; and
    a battery pack configured to be electrically connected to the power tool, wherein the power tool comprises:
  a tool body; and
  a tool electrode base, disposed on the tool body, wherein the tool electrode base comprises a plurality of tool terminals; and
wherein the battery pack which is detachably coupled to the tool body, comprises:
  an upper housing body;
  a lower housing body, connected to the upper housing body to form a battery pack housing;
  a cell unit;
  a battery pack electrode base comprising a plurality of battery pack terminals configured to connect to the plurality of tool terminals;
  a mounting cavity, the mounting cavity being defined in the battery pack housing and accommodating the cell unit and the battery pack electrode base, and the mounting cavity being provided with a plug socket for inserting the plurality of tool terminals to be electrically connected to the plurality of battery pack terminals; and
  a locking apparatus, capable of connecting or detaching the battery pack and the power tool to or from one another,
  wherein when the upper housing body is coupled to the lower housing body, an assembly gap is provided between the upper housing body and the lower housing body, the battery pack further comprises an upper-lower housing body seal member, and the upper-lower housing body seal member blocks a passage from the assembly gap to the mounting cavity,
wherein when the battery pack is coupled to the power tool, a fitting gap exists between the power tool and the battery pack, and at least one of the power tool and the battery pack is configured with a plug socket seal member blocking a passage from the fitting gap to the plug socket, and
wherein the locking apparatus is mounted on the battery pack housing, and the locking apparatus is isolated outside the mounting cavity.

2. The power tool assembly according to claim 1, wherein the tool electrode base is provided with a butting surface,
  wherein at least one of the plurality of tool terminals at least partially protrudes outside the butting surface,
  wherein the battery pack comprises a fitting surface that can butt against and fit the butting surface, and
  wherein the plug socket is formed on the fitting surface.

3. The power tool assembly according to claim 2, wherein the plug socket seal member is disposed between the butting surface and the fitting surface.

4. The power tool assembly according to claim 3, wherein the plug socket seal member is configured to be fixed to the butting surface, and
  wherein when the battery pack is coupled to the power tool, the plug socket seal member is constructed to abut the fitting surface of the battery pack and to isolate the plug socket from the outside.

5. The power tool assembly according to claim 3, wherein the plug socket seal member is movably configured on the tool electrode base, a process of coupling the battery pack to the power tool can cause a change to a distance between the plug socket seal member and the butting surface of the tool electrode base, and at least one distance can prevent external water from entering the mounting cavity through the plug socket.

6. The power tool assembly according to claim 3, wherein the plug socket seal member is a flexible seal washer, the flexible seal washer comprises a plurality of through holes, and the plurality of through holes are used for the plurality of tool terminals to correspondingly pass through.

7. The power tool assembly according to claim 2, wherein the fitting surface of the battery pack is formed by one or more surfaces of the upper housing body of the battery pack, and the plug socket seal member fits the one or more surfaces.

8. The power tool assembly according to claim 1, wherein the battery pack is provided with a heat dissipation opening, the tool body is provided with a heat dissipation opening seal member, and the heat dissipation opening seal member is located above the heat dissipation opening to isolate the heat dissipation opening.

9. The power tool assembly according to claim 1, wherein the battery pack housing is formed with a movement space for the locking apparatus to move, and the movement space is isolated outside the mounting cavity.

10. The power tool assembly according to claim 9, wherein the upper housing body is integrally formed and is provided with a retaining cavity that is concave in an outer surface of the upper housing body and at least partially surrounds the locking apparatus, and the retaining cavity forms a movement space for the locking apparatus to vertically move.

11. The power tool assembly according to claim 1, wherein the upper-lower housing body seal member is disposed at a connection between the upper housing body and the lower housing body, and the upper-lower housing body seal member is constructed to be a seal ring disposed between the upper housing body and the lower housing body.

12. The power tool assembly according to claim 1, wherein the power tool is a handheld pressurized cleaning device, the tool body comprises an operation handle for holding, a body portion disposed at an angle from the operation handle, and a water outlet portion for spraying water,
  the handheld pressurized cleaning device further comprises a functional member, and the functional member comprises a motor disposed in the body portion and a pump for discharging water.

13. The power tool assembly according to claim 12, wherein a working water pressure at which the handheld pressurized cleaning device discharges water is 0.2 Mpa to 10 Mpa, and a working water flowrate at which the handheld pressurized cleaning device discharges water is 1.5 L/Min to 8 L/Min.

14. The power tool assembly according to claim 1, wherein one battery pack is configured, and a nominal output voltage of the battery pack is 18 V to 60 V, or two battery packs are configured, and a nominal output voltage of the battery pack is 18 V to 42.4 V.

15. The battery pack power tool assembly according to claim 1, wherein the locking apparatus is detachably mounted on an outer surface of the upper housing body outside the mounting cavity.

16. The power tool assembly according to claim 9, wherein the locking apparatus comprises an operation portion and a fastener portion, and the operation portion is capable of driving the fastener portion to move within the movement space relative to the upper housing body, to enable the battery pack to operably exit the power tool.

17. The power tool assembly according to claim 16, wherein an elastic apparatus is provided between a bottom surface of the locking apparatus and an outer surface of the upper housing body, and the elastic apparatus can be pressed by the locking apparatus, so that the operation portion drives the fastener portion to move relative to the upper housing body.

18. A power tool assembly comprising:
- a power tool; and
- a battery pack configured to be electrically connected to the power tool, wherein the power tool comprises:
- a tool body;
- a tool electrode base, disposed on the tool body, wherein the tool electrode base comprises a plurality of tool terminals;

wherein the battery pack which is detachably coupled to the tool body, comprises:
- an upper housing body;
- a lower housing body, connected to the upper housing body to form a battery pack housing;
- a cell unit;
- a battery pack electrode base comprising a plurality of battery pack terminals configured to connect to the plurality of tool terminals; and
- a mounting cavity, the mounting cavity being defined in the battery pack housing and accommodating the cell unit and the battery pack electrode base, and the mounting cavity being provided with a plug socket for inserting the plurality of tool terminals to be electrically connected to the plurality of battery pack terminals, wherein when the upper housing body is coupled to the lower housing body, an assembly gap is provided between the upper housing body and the lower housing body, the battery pack further comprises an upper-lower housing body seal member, and the upper-lower housing body seal member blocks a passage from the assembly gap to the mounting cavity, wherein when the battery pack is coupled to the power tool, a fitting gap exists between the power tool and the battery pack, and at least one of the power tool and the battery pack is configured with a plug socket seal member blocking a passage from the fitting gap to the plug socket, and wherein the power tool assembly further comprises a locking apparatus capable of driving the battery pack and the power tool to be connected or detached, and the locking apparatus is isolated outside the mounting cavity.

\* \* \* \* \*

UNITED STATES PATENT AND TRADEMARK OFFICE
CERTIFICATE OF CORRECTION

PATENT NO. : 11,777,180 B2  
APPLICATION NO. : 17/090640  
DATED : October 3, 2023  
INVENTOR(S) : Yong Qiao Page 1 of 1

It is certified that error appears in the above-identified patent and that said Letters Patent is hereby corrected as shown below:

On the Title Page

After item (63), please add:  
--Foreign Application Priority Data  
May 7, 2018 (CN)..............201810428287.6--

Signed and Sealed this  
Fourteenth Day of November, 2023

Katherine Kelly Vidal  
*Director of the United States Patent and Trademark Office*